US008985681B2

(12) United States Patent
Fujii et al.

(10) Patent No.: US 8,985,681 B2
(45) Date of Patent: Mar. 24, 2015

(54) VEHICLE BODY FLOOR STRUCTURE

(71) Applicant: Honda Motor Co., Ltd., Minato-ku, Tokyo (JP)

(72) Inventors: Naho Fujii, Utsunomiya (JP); Junichiro Araki, Utsunomiya (JP); Satoshi Takizawa, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/915,928

(22) Filed: Jun. 12, 2013

(65) Prior Publication Data

US 2013/0341969 A1   Dec. 26, 2013

(30) Foreign Application Priority Data

Jun. 21, 2012  (JP) ................................. 2012-139781
Jun. 21, 2012  (JP) ................................. 2012-139782

(51) Int. Cl.
*B62D 25/20* (2006.01)
*B62D 21/15* (2006.01)
*B62D 25/08* (2006.01)

(52) U.S. Cl.
CPC .......... *B62D 25/2036* (2013.01); *B62D 21/152* (2013.01); *B62D 25/08* (2013.01); *B62D 25/2018* (2013.01)
USPC ..................................................... 296/204

(58) Field of Classification Search
CPC .... B62D 21/07; B62D 21/152; B62D 21/155; B62D 25/025; B62D 25/08; B62D 25/20; B62D 25/2018; B62D 25/2036
USPC .............. 296/187.08, 187.09, 187.1, 187.12, 296/193.07, 193.09, 203.01, 203.02, 204, 296/209
See application file for complete search history.

(56) References Cited

U.S. PATENT DOCUMENTS

| | | | |
|---|---|---|---|
| 5,806,918 A * | 9/1998 | Kanazawa | 296/204 |
| 6,460,918 B1 * | 10/2002 | Sato et al. | 296/204 |
| 6,929,314 B2 * | 8/2005 | Hanyu | 296/203.02 |
| 7,614,684 B2 * | 11/2009 | Yasuhara et al. | 296/187.09 |
| 7,862,108 B2 * | 1/2011 | Tamakoshi | 296/203.03 |
| 8,585,134 B2 * | 11/2013 | Yasui et al. | 296/209 |
| 2003/0137163 A1 * | 7/2003 | Hayashi et al. | 296/204 |
| 2009/0243343 A1 * | 10/2009 | Tamakoshi | 296/204 |

FOREIGN PATENT DOCUMENTS

| | | |
|---|---|---|
| JP | 4021672 B2 | 12/2007 |
| JP | 2010-241261 A | 10/2010 |
| WO | WO 2011074527 A1 * | 6/2011 |

* cited by examiner

*Primary Examiner* — Glenn Dayoan
*Assistant Examiner* — Jason S Daniels
(74) *Attorney, Agent, or Firm* — Carrier Blackman & Associates, P.C.; Joseph P. Carrier; William D. Blackman

(57) ABSTRACT

A vehicle body floor structure reinforces a floor body by a reinforcing portion, and the floor body includes a side sill, an outrigger, a floor cross member, and a tunnel frame. The reinforcing portion includes a first member that connects a corner portion between the side sill and a vehicle body skeleton part formed by the outrigger to a corner portion between a vehicle body skeleton part formed by the floor cross member and a vehicle body skeleton part formed by the tunnel frame, and a second member that connects a front-end vehicle body skeleton part of a front end of the floor body to a middle portion of the first member.

10 Claims, 19 Drawing Sheets

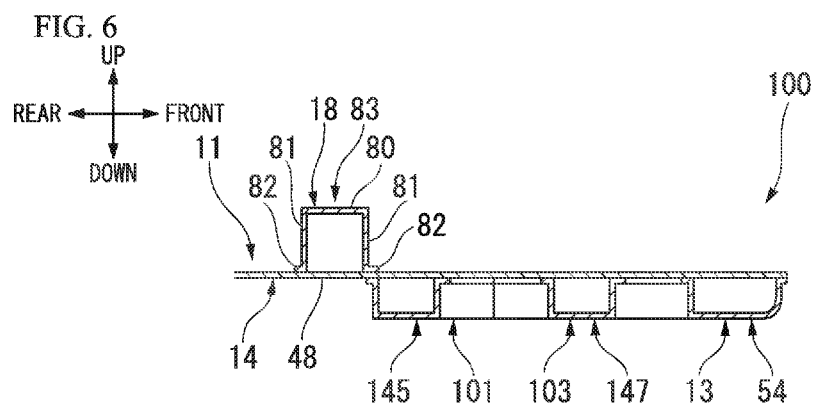
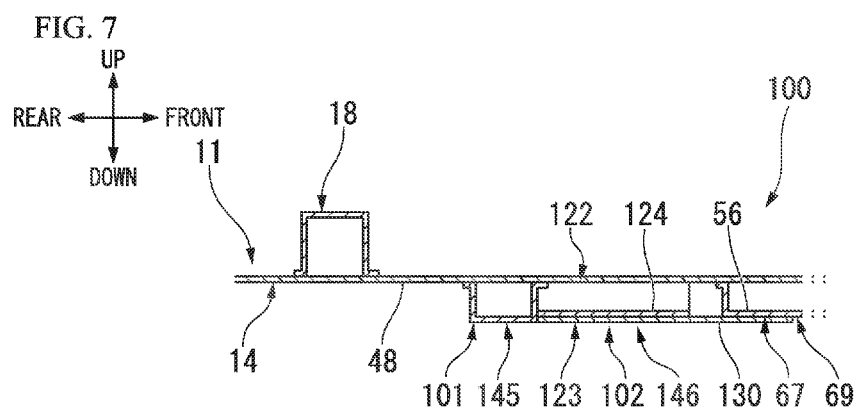
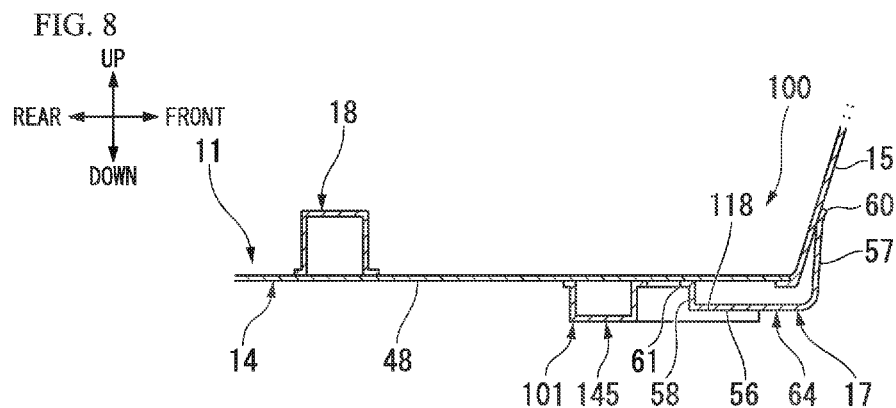

FIG. 12
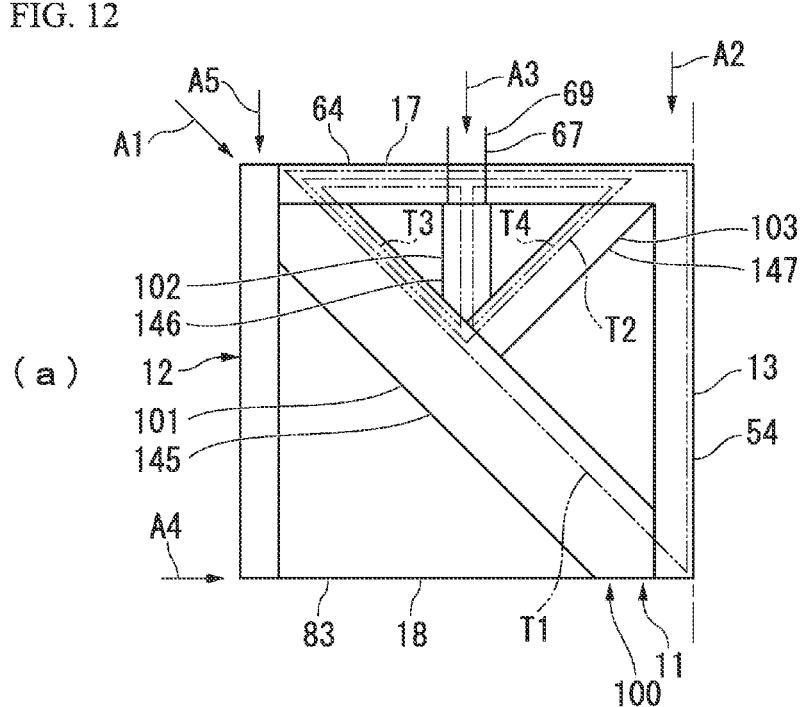
(a)
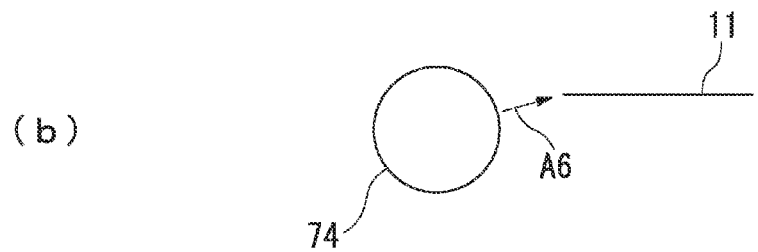
(b)

VEHICLE BODY FLOOR STRUCTURE

CROSS-REFERENCE TO RELATED APPLICATION

Priority is claimed on Japanese Patent Application No. 2012-139781 and Japanese Patent Application No. 2012-139782, filed on Jun. 21, 2012, the contents of which are incorporated herein by reference.

BACKGROUND

1. Field of the Invention

The present invention relates to a vehicle body floor structure of an automobile.

2. Description of Related Art

A technique where a plurality of horizontal core members extending in a vehicle width direction (lateral direction) are arranged in a longitudinal direction and a plurality of vertical core members extending in the longitudinal direction are arranged in the vehicle width direction between upper and lower flat plates is known as a technique relating to a vehicle body floor structure (for example, see Japanese Patent No. 4021672).

Further, a technique that mounts a floor frame (a reinforcing member, a strength member) extending in a longitudinal direction on the bottom (lower surface) of a floor panel to reinforce the floor panel is known (for example, see Japanese Unexamined Patent Application, First Publication No. 2010-241261).

SUMMARY

Among different vehicle collision types, there is a so-called narrow offset collision where an object colliding with an oncoming vehicle or the like collides with the front portion of a vehicle so as to be offset to the outside of a front side frame of the vehicle in the vehicle width direction. When such a narrow offset collision occurs, front wheels move back and collide with the floor. In this case, there is a possibility that a collision load is input to the floor toward a center side of a vehicle width direction in a direction that is inclined rearward from the outside in the vehicle width direction. Since the vertical members extend in the longitudinal direction and the horizontal members extend in the vehicle width direction in the technique disclosed in Japanese Patent No. 4021672, there is a possibility that the deformation of a floor panel or the like cannot be sufficiently suppressed against such a collision load.

Moreover, since the floor frame extends in the longitudinal direction even in the technique disclosed in Japanese Unexamined Patent Application, First Publication No. 2010-241261, there is a possibility that the deformation of the floor panel or the like cannot be sufficiently suppressed against such a collision load.

An object of an aspect of the invention is to provide a vehicle body floor structure that can suppress deformation caused at the time of a narrow offset collision.

The aspect of the invention has employed the following aspects to achieve the above-mentioned object.

(1) According to an aspect of the invention, a vehicle body floor structure is provided that reinforces a floor body by a reinforcing portion. The floor body includes a side sill that is provided on an outer end in a vehicle width direction and extends in a fore and back direction, an outrigger that extends inward from a front end portion of the side sill in the vehicle width direction, a floor cross member that is provided in the rear of the outrigger and extends in the vehicle width direction, and a tunnel frame that is provided in a center side of the vehicle width direction and extends in the fore and back direction. The reinforcing portion includes a first member that connects a corner portion between the side sill and a vehicle body skeleton part formed by the outrigger to a corner portion between a vehicle body skeleton part formed by the floor cross member and a vehicle body skeleton part formed by the tunnel frame, and a second member that connects a front-end vehicle body skeleton part of a front end of the floor body to a middle portion of the first member. The first member of the reinforcing portion in the above vehicle body floor structure corresponds to a first reinforcement member 101 in the first embodiment of the invention disclosed herein, while the second member of the reinforcing portion in the above vehicle body floor structure is exemplified by either a second reinforcement member 102 or a third reinforcement member 103 in a first embodiment of the invention disclosed herein.

(2) In the aspect of (1), the front-end vehicle body skeleton part may be a rear end portion of a vehicle body skeleton part formed by a front side frame, which extends forward from the floor body, and the second member may be connected to the rear end portion.

(3) In the aspect of (1) or (2), the front-end vehicle body skeleton part may be provided with a connecting portion of a sub-frame that supports a suspension component for a front wheel, and the reinforcing portion may include a third member that connects the connecting portion of the sub-frame to the middle portion of the first member.

(4) In the aspect of any one of (1) to (3), the reinforcing portion may include a third member that connects a corner portion between the first and second members to a vehicle body skeleton part formed by the tunnel frame.

(5) In the aspect of any one of (1) to (3), the reinforcing portion may have a Y-like shape that is formed by the first and second members.

(6) In the aspect of any one of (1) to (5), the second member may be connected to a center portion of the first member.

(7) In the aspect of any one of (1) to (6), the first and second members may be connected to each other by a connection panel that forms a double-floor structure together with the floor body.

(8) In the aspect of (1), the reinforcing portion may further include a front portion which is between the first and second members and of which the width is increased in the vehicle width direction toward the front side, and the reinforcing portion may be integrally configured with the first member, the second member and the front portion and form a double-floor structure together with the floor body.

(9) In the aspect of (8), the reinforcing portion may be connected to a rear end portion of a vehicle body skeleton part that is formed by a front side frame extending forward from the floor body.

(10) In the aspect of (8) or (9), the reinforcing portion may be connected to a connecting portion of a sub-frame that supports a suspension component for a front wheel.

(11) In the aspect of any one of (8) to (10), the front portion, of which the width is increased toward the front side, of the reinforcing portion may extend toward only the center side of the vehicle width direction on an extended line of a rear portion of the reinforcing portion extending in a direction where an outer portion of a vehicle body skeleton part, which is formed by the outrigger, in the vehicle width direction, or a front portion of the side sill and a vehicle body skeleton part formed by the tunnel frame are connected to each other.

(12) In the aspect of any one of (8) to (11), an inner surface of the front portion, of which the width is increased toward the front side, of the reinforcing portion facing the center side of the vehicle width direction may be disposed on the rear extension of a rear end portion of a vehicle body skeleton part that is formed by a front side frame extending forward from the floor body.

(13) In the aspect of any one of (8) to (12), a connecting member, which connects the front portion of the reinforcing portion to the floor body, may be provided between the front portion, of which the width is increased toward the front side, of the reinforcing portion and the floor body.

According to the aspect of (1), when a vehicle is subjected to a narrow offset collision, a collision load is input to the floor body through the front wheel toward the center side of the vehicle width direction in the direction that is inclined rearward from the outside in the vehicle width direction. However, this collision load is dispersed to the side sill, the vehicle body skeleton part that is formed by the outrigger, and the first member that are connected to a corner portion between these. In this case, the load of the first member formed along the direction where the collision load is input is increased, but the collision load input to the first member is dispersed to the vehicle body skeleton part that is formed by the tunnel frame and the vehicle body skeleton part that is formed by the floor cross member from a corner portion to which the other end of the first member is connected and which is formed between these vehicle body skeleton parts. Accordingly, it is possible to suppress the deformation of the floor body that is caused by the collision load. Further, even though a collision load is large and the first member is to be deformed in the direction crossing the extension direction thereof, the second member, which connects the front-end vehicle body skeleton part of the floor body to the middle portion of the first member, suppresses this bending deformation in both a tensile direction and a compression direction. Accordingly, the yield strength of the first member is increased. Therefore, it is possible to suppress deformation that occurs at the time of a narrow offset collision.

According to the aspect of (2), since the second member is connected to the rear end portion of the front side frame extending forward from the floor body, it is possible to input a load, which is input to the front portion of the floor body from the front side frame at the time of a frontal collision, to the middle portion of the first member from the second member formed along the direction where the collision load is input and to disperse the load to the vehicle body skeleton part, which is formed by the tunnel frame, and the vehicle body skeleton part, which is formed by the floor cross member, through the first member. Accordingly, since it is possible to reduce a load that is transmitted to the side sill from the front side frame through the vehicle body skeleton part formed by the outrigger, it is possible to reduce the strength of the outrigger.

According to the aspect of (3), since the third member that connects the middle portion of the first member to the connecting portion of the sub-frame supporting the suspension component for the front wheel is provided, it is possible to input a load, which is input to the front portion of the floor body from the sub-frame at the time of a frontal collision, to the middle portion of the first member from the third member and to disperse the load to the vehicle body skeleton part, which is formed by the tunnel frame, and the vehicle body skeleton part, which is formed by the floor cross member, through the first member. Accordingly, since it is possible to reduce a load transmitted to the side sill from the vehicle body skeleton part, which is provided with the connecting portion of the sub-frame, through the vehicle body skeleton part formed by the outrigger, it is possible to reduce the strength of the outrigger.

According to the aspect of (4), even though the first member is to be deformed in the direction crossing the extension direction thereof, the third member, which connects the corner portion between the first and second members to the vehicle body skeleton part formed by the tunnel frame, suppresses this bending deformation in both a tensile direction and a compression direction together with the second member. Accordingly, the yield strength of the first member is further increased. Therefore, it is possible to further suppress deformation that occurs at the time of a narrow offset collision.

According to the aspect of (5), since the reinforcing portion has a Y-like shape that is formed by the first and second members, it is possible to suppress the increase of the weight of the reinforcing portion.

According to the aspect of (6), since the second member is connected to the center portion of the first member, it is possible to further increase the stiffness of the first member where the load of a narrow offset collision is large.

According to the aspect of (7), since the first and second members are connected to each other by a connection panel that forms a double-floor structure together with the floor body, it is possible to increase yield strength against a collision load that is generated at the time of a frontal collision and is applied to the front portion of the floor body from the front side frame or the sub-frame and to reinforce the vicinity of a collision portion at the time of a narrow offset collision.

According to the aspect of (8), when a vehicle is subjected to a narrow offset collision, a collision load is input to the floor body through the front wheel toward the center side of the vehicle width direction in the direction that is inclined rearward from the outside in the vehicle width direction. However, this collision load is dispersed to the side sill, the vehicle body skeleton part formed by the outrigger, and the reinforcing portion connected to the outer portion of the vehicle body skeleton part, which is formed by the outrigger, in the vehicle width direction or the front portion of the side sill. In this case, the load of the reinforcing portion formed along the direction where the collision load is input is increased, but the collision load input to the reinforcing portion is dispersed to the vehicle body skeleton part that is formed by the tunnel frame to which the other end of the reinforcing portion is connected. Accordingly, it is possible to suppress the deformation of the floor body that is caused by the collision load. Further, even though a collision load is large and the reinforcing portion is to be deformed in the direction crossing the extension direction thereof, this bending deformation is suppressed in both a tensile direction and a compression direction since the front portion of the reinforcing portion is formed so as to extend while the width of the front portion is increased toward the front side. Accordingly, it is possible to suppress deformation that occurs at the time of a narrow offset collision. Furthermore, since the width of the front portion of the reinforcing member is increased toward the front side so that the front portion of the reinforcing member forms a double-floor structure together with the floor body, it is possible to generate a reaction force even against the load of a frontal collision that is applied to the front end of the floor body.

According to the aspect of (9), since the reinforcing portion is connected to the rear end portion of the vehicle body skeleton part that is formed by the front side frame extending forward from the floor body, it is possible to generate a reaction force against a load, which is input to the front portion of the floor body from the front side frame at the time of a frontal collision, by the double-floor structure that is formed by the reinforcing portion and the floor body. Accordingly, since it is possible to reduce a load transmitted to the side sill from the front side frame through the vehicle body skeleton part that is formed by the outrigger, it is possible to reduce the strength of the outrigger.

According to the aspect of (10), since the reinforcing portion is connected to the connecting portion of the sub-frame that supports the suspension component for the front wheel, it is possible to generate a reaction force against a load, which is input to the front portion of the floor body from the subframe at the time of a frontal collision, by the double-floor structure that is formed by the reinforcing portion and the floor body. Accordingly, since it is possible to reduce a load transmitted to the side sill from the vehicle body skeleton part, which is provided with the connecting portion of the subframe, through the vehicle body skeleton part formed by the outrigger, it is possible to reduce the strength of the outrigger.

According to the aspect of (11), since the front portion, of which the width is increased toward the front side, extends toward only the center side of the vehicle width direction on the extended line of the rear portion, it is possible to linearly form the outer portion of the reinforcing portion in the vehicle width direction. Accordingly, it is possible to suppress the increase of the weight of the reinforcing portion.

According to the aspect of (12), since the inner surface of the front portion, of which the width is increased toward the front side, facing the center side of the vehicle width direction is disposed on the rear extension of the rear end portion of the vehicle body skeleton part that is formed by the front side frame extending forward from the floor body, it is possible to smoothly transmit a load, which is input to the front portion of the floor body from the vehicle body skeleton part formed by the front side frame at the time of a frontal collision, to the vehicle body skeleton part formed by the tunnel frame.

According to the aspect of (13), since the connecting member, which connects the front portion to the floor body, is provided between the front portion of which the width is increased toward the front side and the floor body, it is possible to further reinforce the floor body.

BRIEF DESCRIPTION OF THE DRAWINGS

FIG. 6 is a cross-sectional view taken along line Y1-Y1 of FIG. 1.

FIG. 7 is a cross-sectional view taken along line Y2-Y2 of FIG. 1.

FIG. 8 is a cross-sectional view taken along line Y3-Y3 of FIG. 1.

FIG. 12A is a conceptual diagram illustrating the directions of loads input to the vehicle body floor structure according to the first embodiment of the invention.

FIG. 12B is a conceptual diagram illustrating the directions of loads input to the vehicle body floor structure according to the first embodiment of the invention.

DESCRIPTION OF EMBODIMENTS

Figure 1:
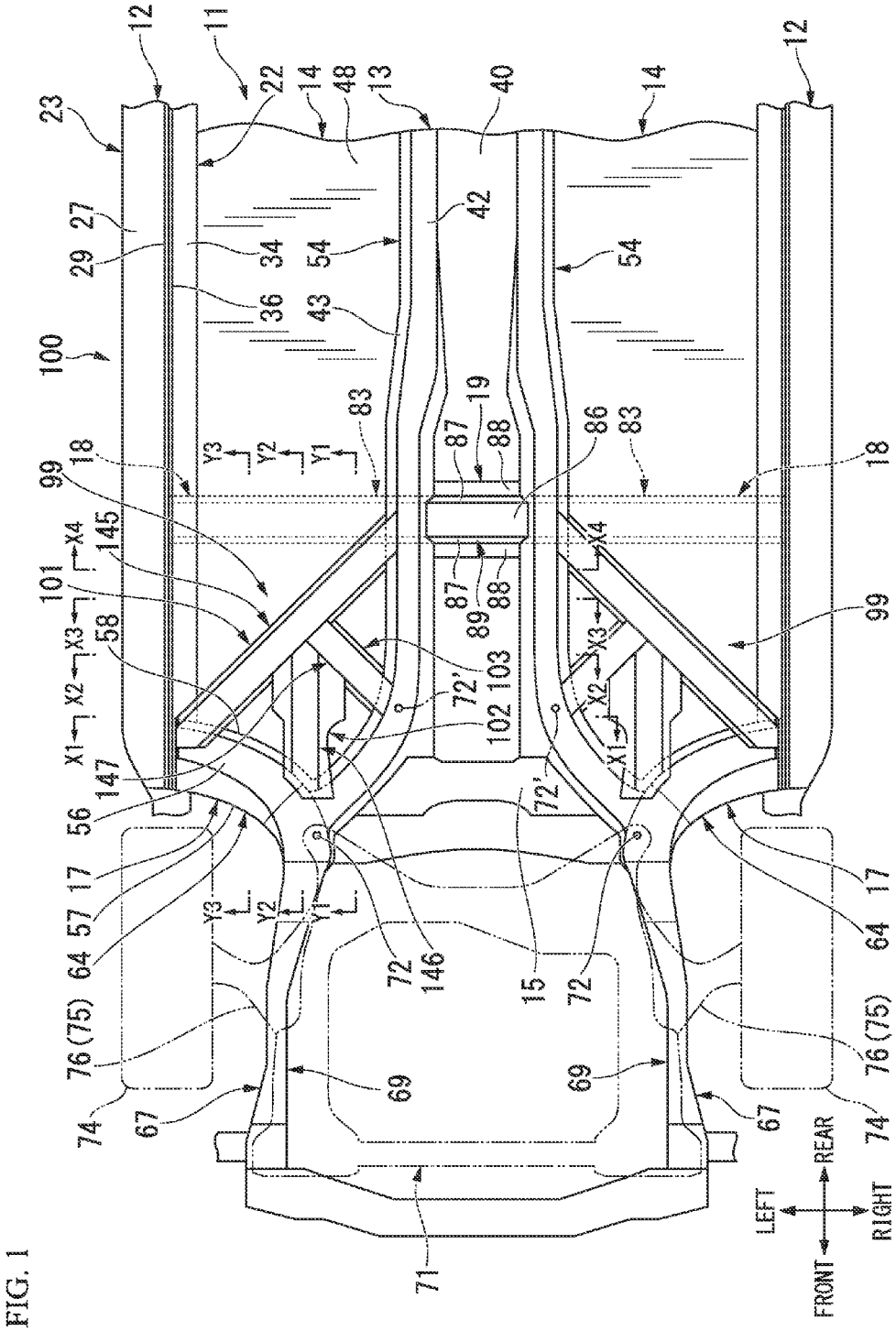
FIG. 1 is a view of a vehicle body floor structure according to a first embodiment of the invention when seen from below.

A vehicle body floor structure according to a first embodiment of the invention will be described referring to the drawings. The vehicle body floor structure according to this embodiment is a vehicle body floor structure for a four-wheeled vehicle.

As shown in FIG. 1, a floor body 11 of the vehicle body floor structure according to this embodiment includes a pair of side sills 12 that are provided on both outer ends in a vehicle width direction (lateral direction) and extend in a fore and back direction, a tunnel frame 13 that is provided in a center of the vehicle width direction and extends in the fore and back direction, a pair of floor panels 14 that connect the pair of side sills 12 to the tunnel frame 13, and a dash lower panel 15 that is provided in front of the floor panels 14. Further, the floor body 11 includes a pair of outriggers 17 that extend inward from front end portions of the respective side sills 12 in the vehicle width direction, a pair of floor cross members 18 that are provided in the rear of the outriggers 17 and extend in the vehicle width direction, and a tunnel cross member 19 that is provided in the tunnel frame 13 and extends in the vehicle width direction.

Figure 2:
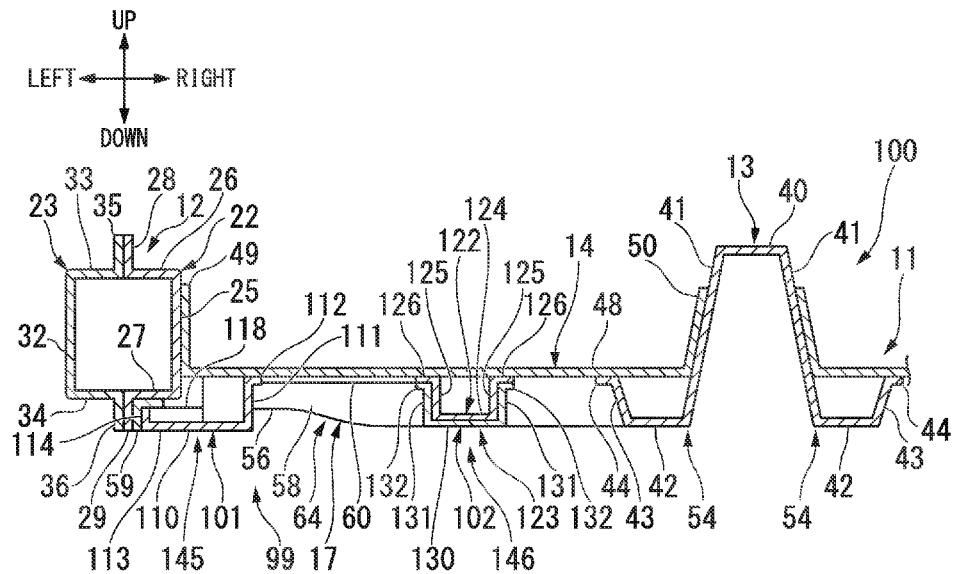
FIG. 2 is a cross-sectional view taken along line X1-X1 of FIG. 1.

As shown in FIGS. 2 to 5, the side sill 12 includes an inner sill 22 and an outer sill 23. As shown in FIG. 2, the inner sill 22 has a hat-like cross-sectional shape, and includes a base plate portion 25 that extends in the fore and back direction so as to be formed along a vertical direction, an upper plate portion 26 that extends outward from an upper edge portion of the base plate portion 25 in the vehicle width direction, a lower plate portion 27 that extends outward from a lower edge portion of the base plate portion 25 in the vehicle width direction, an upper flange portion 28 that extends upward from an outer edge portion of the upper plate portion 26 in the vehicle width direction, and a lower flange portion 29 that extends downward from an outer edge portion of the lower plate portion 27 in the vehicle width direction.

The outer sill 23 has a hat-like cross-sectional shape, and includes a base plate portion 32 that extends in the fore and back direction so as to be formed along the vertical direction, an upper plate portion 33 that extends inward from an upper edge portion of the base plate portion 32 in the vehicle width direction, a lower plate portion 34 that extends inward from a lower edge portion of the base plate portion 32 in the vehicle width direction, an upper flange portion 35 that extends upward from an inner edge portion of the upper plate portion 33 in the vehicle width direction, and a lower flange portion 36 that extends downward from an inner edge portion of the lower plate portion 34 in the vehicle width direction.

Further, the upper flange portions 28 and 35 are joined to each other and the lower flange portions 29 and 36 are joined to each other, so that the inner sill 22 and the outer sill 23 are integrated with each other. Accordingly, the side sill 12 has a closed cross-sectional structure. The pair of side sills 12 form vehicle body skeleton parts having a closed cross-sectional structure, respectively.

The tunnel frame 13 includes an upper plate portion 40 that is provided in the center of the vehicle width direction and extends in the fore and back direction so as to be substantially horizontal, a pair of wall plate portions 41 that extend obliquely downward from both outer edge portions of the upper plate portion 40 in the vehicle width direction so as to be positioned closer to the outside in the vehicle width direction toward the lower side, a pair of bottom plate portions 42 that extend outward in the vehicle width direction from the respective lower edge portions of the pair of wall plate portions 41 so as to be substantially horizontal, a pair of lower wall plate portions 43 that extend obliquely upward from the respective outer edge portions of the pair of bottom plate portions 42 in the vehicle width direction so as to be positioned closer to the outside in the vehicle width direction toward the upper side, and a pair of flange portions 44 that extend outward in the vehicle width direction from the respective upper edge portions of the pair of lower wall plate portions 43.

The floor panel 14 includes a base plate portion 48 that is substantially horizontally disposed, an outer joint plate portion 49 that extends upward from an outer edge portion of the base plate portion 48 in the vehicle width direction, and an inner joint plate portion 50 that extend obliquely upward from an inner edge portion of the base plate portion 48 in the vehicle width direction so as to be positioned closer to the center side of the vehicle width direction toward the upper side.

The outer joint plate portion 49 of the floor panel 14 is joined and fixed to the base plate portion 25 of the inner sill 22 of the side sill 12, the inner joint plate portion 50 of the floor panel is joined and fixed to the wall plate portion 41 of the tunnel frame 13, and the base plate portion 48 of the floor panel is joined and fixed to the flange portion 44 of the tunnel frame 13. Accordingly, the wall plate portion 41, the bottom plate portion 42, the lower wall plate portion 43, and the flange portion 44 of the tunnel frame 13 and the base plate portion 48 of the floor panel 14 form the vehicle body skeleton part (front-end vehicle body skeleton part) 54 having a closed cross-sectional structure shown in FIGS. 2 to 6. As shown in FIGS. 1 to 5, the vehicle body skeleton parts 54 are provided on both side portions of the tunnel frame 13 in the vehicle width direction so as to make a pair. These vehicle body skeleton parts 54 extend in the fore and back direction, and front portions of the vehicle body skeleton parts are bent so as to be positioned closer to the outside in the vehicle width direction toward the front side as shown in FIG. 1.

As shown in FIG. 8, the dash lower panel 15 is connected to the front end portions of the floor panels 14 and extends obliquely upward and forward from the floor panels 14.

The outrigger 17 is formed in a substantially circular arc shape as shown in FIG. 1, and includes a base plate portion 56 that is substantially horizontally disposed as shown in FIG. 8, a wall plate portion 57 that extends upward from a front edge portion of the base plate portion 56, a wall plate portion 58 that extends upward from a rear edge portion of the base plate portion 56, a flange portion 59 that extends downward from an outer end portion of the base plate portion 56 in the vehicle width direction as shown in FIG. 2, a flange portion 60 that is formed at an upper edge portion of the wall plate portion 57 as shown in FIG. 8, and a flange portion 61 that is formed at an upper edge portion of the wall plate portion 58.

The flange portion 60 of the outrigger 17, which is formed at the upper edge portion of the wall plate portion 57, is joined and fixed to the dash lower panel 15 from the front, and the flange portion 61 of the outrigger, which is formed at the upper edge portion of the wall plate portion 58, is joined and fixed to the front end portion of the floor panel 14 from below. Further, as shown in FIG. 2, the base plate portion 56 of the outrigger 17 is joined and fixed to the lower plate portion 27 of the inner sill 22 of the side sill 12 from below and the flange portion 59 of the outrigger, which is formed at the outer end of the base plate portion in the vehicle width direction, is joined and fixed to the lower flange portion 29 of the inner sill 22 from the inside in the vehicle width direction.

The outrigger 17 forms a vehicle body skeleton part (front-end vehicle body skeleton part) 64, which has a closed cross-sectional structure, together with the floor panel 14 and the dash lower panel 15 as shown in FIG. 8. The vehicle body skeleton parts 64, which are formed by the outriggers 17, are provided so as to make a pair just like the outriggers 17. As shown in FIG. 1, all of these vehicle body skeleton parts 64 extend in the vehicle width direction and are bent so as to be positioned closer to the front side toward the inside in the vehicle width direction. The outer end portions of the pair of vehicle body skeleton parts 64, which are formed by the outriggers 17, in the vehicle width direction are connected to the front end portions of the side sills 12, which are positioned on the same side in the vehicle width direction, from the inside in the vehicle width direction.

A pair of front side frames 67 are connected to the front end portion of the floor body 11 so as to extend forward from the floor body 11. The front side frame 67 has a closed cross-sectional structure except for the rear end portion thereof, and the rear end portion of the front side frame 67 forms a closed cross-sectional structure by being joined and fixed to the floor panel 14 from below. The front side frame 67 forms a vehicle body skeleton part (front-end vehicle body skeleton part) 69 having a closed cross-sectional structure together with the floor panel 14. The vehicle body skeleton parts 69 are provided so as to make a pair just like the front side frames 67.

The inner end portions of the vehicle body skeleton parts 64, which are formed by the outriggers 17 and have a closed cross-sectional structure on the same side in the vehicle width direction, in the vehicle width direction and the front end portions of the vehicle body skeleton parts 54, which are formed by the tunnel frame 13 and have a closed cross-sectional structure on the same side in the vehicle width direction, are connected to the rear end portions of the pair of vehicle body skeleton parts 69 that are formed by the front side frames 67 and have a closed cross-sectional structure. In other words, the rear end portion of the vehicle body skeleton part 69, which is formed by the front side frame 67, is branched into the vehicle body skeleton part 64 that is formed by the outrigger 17 and the vehicle body skeleton part 54 that is formed by the tunnel frame 13, and the vehicle body skeleton part 64 formed by the outrigger 17 is further connected to the side sill 12 as a vehicle body skeleton part.

As described above, the pair of vehicle body skeleton parts 64 that are formed by the outriggers 17, the front end portions of the pair of vehicle body skeleton parts 54 that are formed by the tunnel frame 13, and the rear end portions of the pair of the vehicle body skeleton parts 69 that are formed by the front side frames 67 are disposed at the front end of the floor body 11. All of these are disposed below the floor panel 14. Further, the front end portions of the pair of the side sills 12 as the vehicle body skeleton parts are also disposed at the front end of the floor body 11.

Among the front end portions of the pair of vehicle body skeleton parts 54, the pair of vehicle body skeleton parts 64, and the rear end portions of the pair of vehicle body skeleton parts 69 that are disposed at the front end of the floor body 11, any one pair of vehicle body skeleton parts are provided with a pair of connecting portions 72 that are used to connect a rear portion of a sub-frame 71. Here, the pair of connecting portions 72 of the sub-frame 71 are provided at the rear end portions of the pair of vehicle body skeleton parts 69 that are formed by the front side frame 67. Meanwhile, the sub-frame 71 is provided to support a pair of lower arms (suspension components) 76 and the like of suspension devices 75 for front wheels 74 that are provided on both sides in the vehicle width direction. Both of the front wheels 74, which are supported by the pair of lower arms (suspension components) 76 and the like of the suspension device 75, are disposed in front of the side sills 12, respectively.

Figure 5:
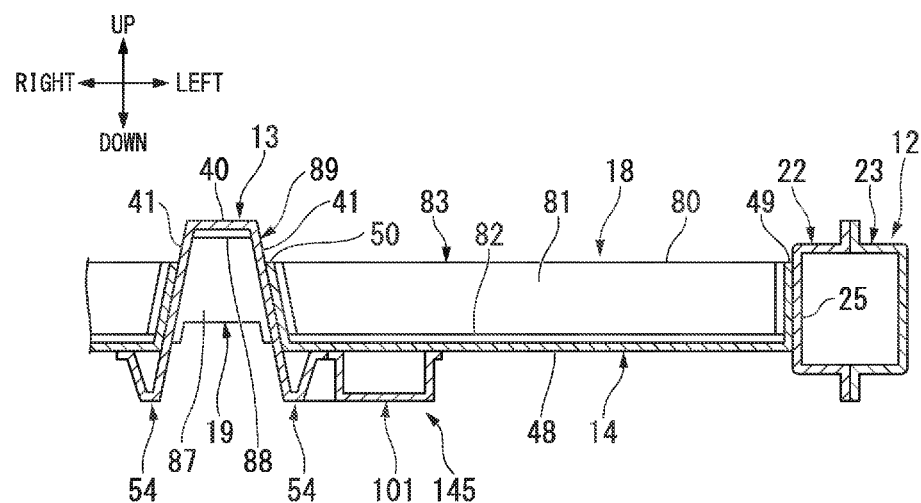
FIG. 5 is a cross-sectional view taken along line X4-X4 of FIG. 1.

The floor cross members 18 are used to mount, for example, front seats thereon. As shown in FIGS. 5 and 6, the floor cross members 18 include an upper plate portion 80 that extends in the vehicle width direction so as to be substantially horizontal, a pair of wall plate portions 81 that extend downward from both front and rear edge portions of the upper plate portion 80, and a pair of flange portions 82 that extend outward in the fore and back direction from the respective lower edge portions of the pair of wall plate portions 81 so as to be substantially horizontal.

As shown in FIG. 6, the pair of flange portions 82 of the floor cross member 18 are joined and fixed to the base plate portion 48 of the floor panel 14 from above. As shown in FIG. 5, the floor cross member 18 is connected to the base plate portion 25 of the inner sill 22 of the side sill 12 with the outer joint plate portion 49 of the floor panel 14 interposed therebetween, and is connected to the wall plate portion 41 of the tunnel frame 13 with the inner joint plate portion 50 of the floor panel 14 interposed therebetween.

The floor cross member 18 forms a vehicle body skeleton part 83, which has a closed cross-sectional structure, together with the base plate portion 48 of the floor panel 14. As shown in FIG. 1, the vehicle body skeleton parts 83 are provided so as to make a pair just like the floor cross members 18. One end of each of the pair of vehicle body skeleton parts 83, which are formed by the floor cross members 18, is connected to the side sill 12 positioned on the same side in the vehicle width direction, and the other end thereof is connected to the vehicle body skeleton part 54 positioned on the same side as the tunnel frame 13 in the vehicle width direction.

The tunnel cross member 19 includes a lower plate portion 86 that extends in the vehicle width direction so as to be substantially horizontal, a pair of wall plate portions 87 that extend upward from both front and rear edge portions of the lower plate portion 86, and a pair of flange portions 88 that extends outward in the fore and back direction from the respective upper edge portions of the pair of wall plate portions 87 so as to be substantially horizontal. The pair of flange portions 88 of the tunnel cross member 19 are joined and fixed to the upper plate portion 40 of the tunnel frame 13 from below, and the tunnel cross member 19 is connected to both the wall plate portions 41 of the tunnel frame 13 as shown in FIG. 5. The tunnel cross member 19 forms a vehicle body skeleton part 89, which has a closed cross-sectional structure, together with the upper plate portion 40 of the tunnel frame 13. The vehicle body skeleton part 89 formed by the tunnel cross member 19 and the pair of vehicle body skeleton parts 83 formed by the floor cross members 18 are disposed on the same straight line as shown in FIGS. 1 and 5.

As shown in FIG. 1, in the vehicle body floor structure according to this embodiment, a pair of reinforcing portions (reinforcing members) 99 are mounted on the front portion of the floor body 11 having the above-mentioned structure, so that a vehicle body floor 100 is formed. Each of the pair of reinforcing portions 99 includes a reinforcing member (first member) 101 that is inclined so as to be positioned closer to the center side of the vehicle width direction toward the rear side, a reinforcing member (second member) 102 that extends forward from a middle portion of the reinforcing member 101 so as to be parallel to the fore and back direction, and a reinforcing member (third member) 103 that extends obliquely from the middle portion of the reinforcing member 101 so as to be positioned closer to the center side of the vehicle width direction toward the front side. The reinforcing members 101 and 103 are orthogonal to each other, and the reinforcing member 102 is disposed on a bisector of an angle between these reinforcing members 101 and 103.

Figure 9:
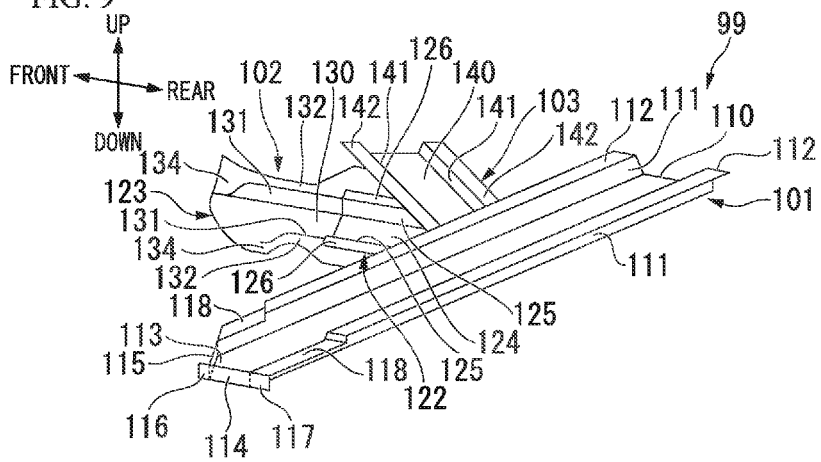
FIG. 9 is a perspective view of a reinforcing portion of the vehicle body floor structure according to the first embodiment of the invention.

As shown in FIG. 9, the reinforcing member 101 has a hat-like cross-sectional shape, and includes a main plate portion 110 that is linearly formed so as to be elongated in one direction and is disposed substantially horizontally, a pair of wall plate portions 111 that stand from both edge portions of the main plate portion 110 in a width direction so as to be substantially perpendicular to the main plate portion 110, and a pair of flange portions 112 that extend in directions opposite to each other from edge portions of the pair of wall plate portions 111 opposite to the main plate portion 110 so as to be substantially parallel to the main plate portion 110. A pointed portion 113 having a tapered triangular shape is formed at one end portion of the main plate portion 110 in a lengthwise direction, and a pair of stepped portions 118, which are formed in a stepped shape so as to be positioned closer to the main plate portion 110 than other portions, are formed at portions of the pair of flange portions 112 that are close to the pointed portion 113.

The pointed portion 113 is also provided with a wall plate portion 114 that stands on the same side as the pair of wall plate portions 111 from one edge portion and a wall plate portion 115 that stands on the same side as the pair of wall plate portions 111 from the other edge portion. One end of the wall plate portion 114 is connected to one wall plate portion 111 and the other end thereof is connected to one end of the wall plate portion 115. The other end of the wall plate portion 115 is connected to the other wall plate portion 111.

A flange portion 116 that protrudes further than the wall plate portion 115 and a flange portion 117 that protrudes toward the side opposite to the flange portion 116 are formed on the extension of the wall plate portion 114. As shown in FIG. 10A, the side of the reinforcing member 101 opposite to the pointed portion 113 is formed so as to be inclined with respect to the lengthwise direction.

As shown in FIG. 9, the reinforcing member 102 includes an inner member 122 and an outer member 123. The inner member 122 has a hat-like cross-sectional shape, and includes a main plate portion 124 that is linearly formed so as to be elongated in one direction and is disposed substantially horizontally, a pair of wall plate portions 125 that stand from both edge portions of the main plate portion 124 in a width direction so as to be substantially perpendicular to the main plate portion 124, and a pair of flange portions 126 that extend in directions opposite to each other from edge portions of the pair of wall plate portions 125 opposite to the main plate portion 124 so as to be substantially parallel to the main plate portion 124. As shown in FIG. 10A, a pointed portion 127 having a tapered triangular shape is formed at one end portion of the main plate portion 124 in a lengthwise direction.

As shown in FIG. 9, the outer member 123 mainly has a hat-like cross-sectional shape, and includes a main plate portion 130 that is substantially linearly formed so as to be elongated in one direction and is disposed substantially horizontally, a pair of wall plate portions 131 that stand from both edge portions of the main plate portion 130 in a width direction so as to be substantially perpendicular to the main plate portion 130, and a pair of flange portions 132 that extend in directions opposite to each other from edge portions of the pair of wall plate portions 131 opposite to the main plate portion 130 so as to be substantially parallel to the main plate portion 130. A pair of stepped portions 134, which are formed in a stepped shape so as to be positioned closer to the main plate portion 130 than other portions, are formed at portions of the pair of flange portions 132 that are close to one end portion of the outer member 123 in a lengthwise direction.

The reinforcing member 103 has a hat-like cross-sectional shape, and includes a main plate portion 140 that is linearly formed so as to be elongated in one direction and is disposed substantially horizontally, a pair of wall plate portions 141 that stand from both edge portions of the main plate portion 140 in a width direction so as to be substantially perpendicular to the main plate portion 140, and a pair of flange portions 142 that extend in directions opposite to each other from edge portions of the pair of wall plate portions 141 opposite to the main plate portion 140 so as to be substantially parallel to the main plate portion 140. One end portion of the reinforcing member 103 in a lengthwise direction is formed so as to be inclined with respect to the lengthwise direction.

Figure 3:
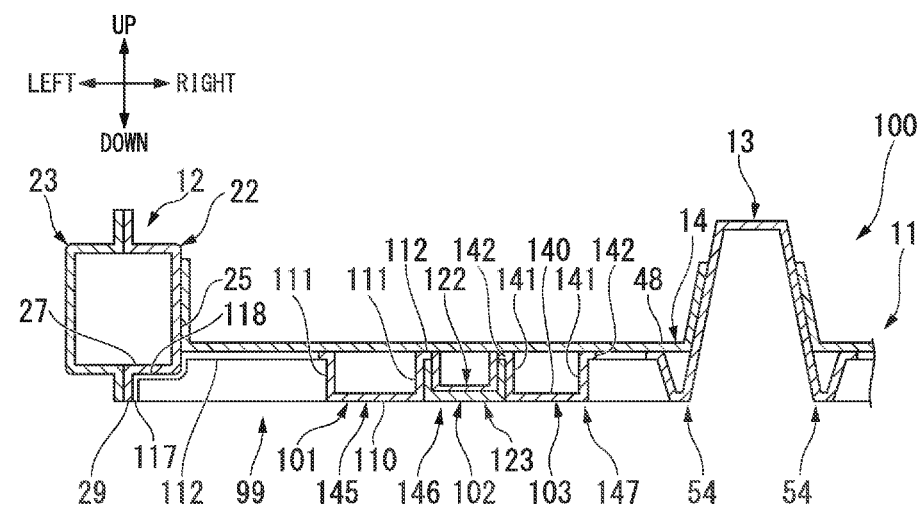
FIG. 3 is a cross-sectional view taken along line X2-X2 of FIG. 1.
Figure 4:
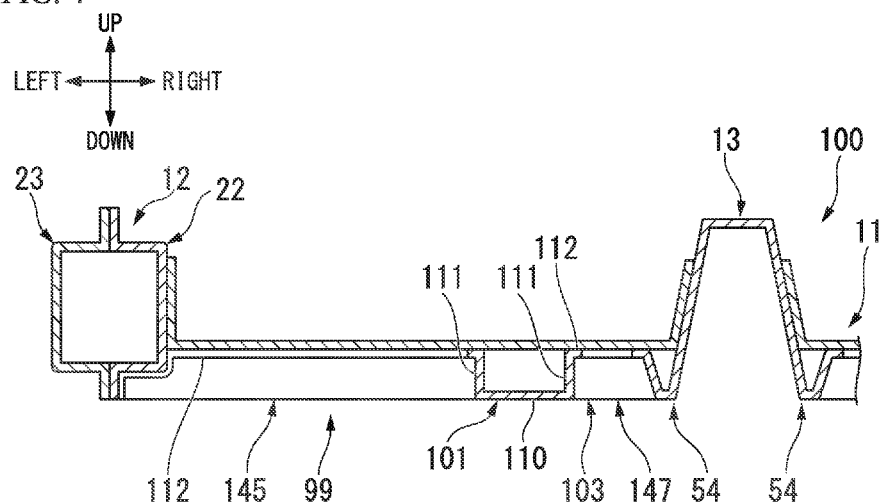
FIG. 4 is a cross-sectional view taken along line X3-X3 of FIG. 1.
Figure 10:
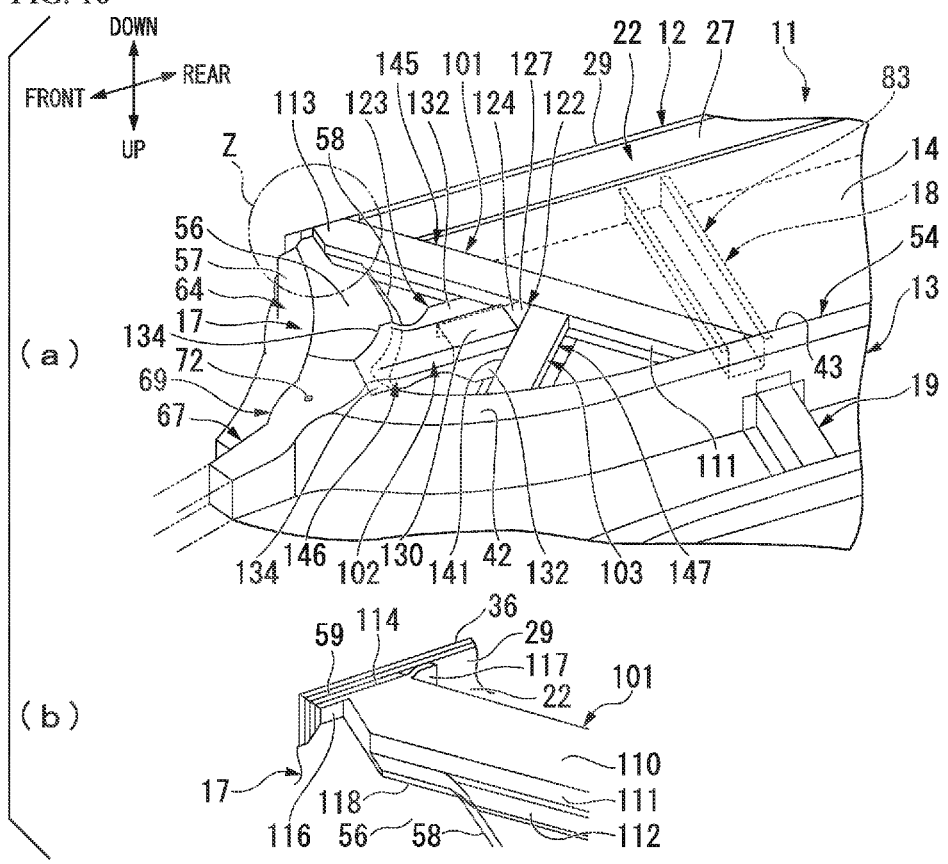
FIG. 10A is a perspective view of the vehicle body floor structure according to the first embodiment of the invention when seen from below, and is a view showing main parts.
FIG. 10B is an enlarged view of a portion Z of FIG. 10A.

A portion of the reinforcing member 101 where the pointed portion 113 is formed is referred to as a front end portion as shown in FIG. 10A, the wall plate portion 114 and the flange portion 116 are joined and fixed to the flange portion 59 of the outrigger 17 as shown in FIG. 10B, and the flange portion 117 is joined and fixed to the lower flange portion 29 of the inner sill 22 as shown in FIG. 3. Further, as for the reinforcing member 101, one of the pair of stepped portions 118 of the pair of flange portions 112 shown in FIG. 9 is joined and fixed to the base plate portion 56 and the wall plate portion 58 of the outrigger 17 shown in FIG. 10B and the other thereof is joined and fixed to the lower plate portion 27 and the base plate portion 25 of the inner sill 22 as shown in FIG. 3. Furthermore, as for the reinforcing member 101, portions of the pair of flange portions 112 except for the pair of stepped portions 118 are joined and fixed to the lower surface of the floor panel 14 as shown in FIGS. 3, 4, and 10. Accordingly, the reinforcing member 101 forms a closed cross-sectional structure part 145 as an inclined skeleton together with the base plate portion 56 and the wall plate portion 58 of the outrigger 17, the lower plate portion 27 and the base plate portion 25 of the inner sill 22, and the floor panel 14.

As shown in FIG. 1, the front end portion of the reinforcing member 101 is connected to the outrigger 17 and the side sill 12 as described above. Accordingly, the front end portions of both the reinforcing member 101 and the closed cross-sectional structure part 145, which is formed by the reinforcing member 101, are connected to the vehicle body skeleton part 64 that is formed by the outrigger 17 and the side sill 12 as a vehicle body skeleton part. In other words, the front end portions of both the reinforcing member 101 and the closed cross-sectional structure part 145 are connected to a corner portion between the outrigger 17 and the side sill 12, and are connected to a corner portion between the vehicle body skeleton part 64 that is formed by the outrigger 17 and the side sill 12.

The inclined rear end portion of the reinforcing member 101 is connected to the lower wall plate portion 43 of the tunnel frame 13, and the rear end portions of both the reinforcing member 101 and the closed cross-sectional structure part 145 formed by the reinforcing member 101 are connected to the vehicle body skeleton part 54 that is formed by the tunnel frame 13. Here, since the rear end portion of the reinforcing member 101 overlaps the floor cross member 18 in plan view, the rear end portions of the reinforcing member 101 and the closed cross-sectional structure part 145 are also connected to the vehicle body skeleton part 83 that is formed by the floor cross member 18. In other words, the rear end portions of the reinforcing member 101 and the closed cross-sectional structure part 145 are connected to the corner portion between the vehicle body skeleton part 54 that is formed by the tunnel frame 13 and the vehicle body skeleton part 83 that is formed by the floor cross member 18.

A portion of the reinforcing member 103, which is inclined with respect to the lengthwise direction, is referred to as a front end portion, and the pair of flange portions 142 are joined and fixed to the lower surface of the floor panel 14 as shown in FIG. 3. Accordingly, the reinforcing member 103 forms a closed cross-sectional structure part 147 as a small skeleton, which is smaller than the closed cross-sectional structure part 145, together with the base plate portion 48 of the floor panel 14. Since the front end portion, which is inclined as shown in FIG. 1, of the reinforcing member 103 is connected to the lower wall plate portion 43 of the tunnel frame 13, the front end portions of both the reinforcing member 103 and the closed cross-sectional structure part 147 formed by the reinforcing member 103 are connected to the vehicle body skeleton part 54 that is formed by the tunnel frame 13. Further, the rear end portion of the reinforcing member 103 is connected to the wall plate portion 111 of the reinforcing member 101 as shown in FIG. 10. Accordingly, the rear end portions of both the reinforcing member 103 and the closed cross-sectional structure part 147 are connected to the reinforcing member 101 and the closed cross-sectional structure part 145. Meanwhile, the reinforcing member 103 and the closed cross-sectional structure part 147 are connected to the reinforcing member 101 and the closed cross-sectional structure part 145 so as to be orthogonal to the reinforcing member 101 and the closed cross-sectional structure part 145.

The pointed portion 127 of the inner member 122 of the reinforcing member 102 corresponds to the rear end side, the pair of flange portions 126 are joined and fixed to the lower surface of the base plate portion 48 of the floor panel 14 as shown in FIG. 2. In this case, as shown in FIG. 10A, the rear end portion of the reinforcing member 102 corresponding to the pointed portion 127 of the inner member 122 is connected to the wall plate portion 111 of the reinforcing member 101 and the wall plate portion 141 of the reinforcing member 103.

The outer member 123 of the reinforcing member 102 is disposed so as to be covered with the inner member 122. The pair of stepped portions 134 of the pair of flange portions 132 of the reinforcing member 102 correspond to the front side, one stepped portion 134 is joined and fixed to the lower surface of the base plate portion 56 of the outrigger 17 and the wall plate portion 58, the main plate portion 130 is joined and fixed to the lower surface of the base plate portion 56 of the outrigger 17 and the lower surface of the front side frame 67, and the other stepped portion 134 is joined and fixed to the lower surface of the bottom plate portion 42 of the tunnel frame 13. Further, portions of the pair of flange portions 132 except for the pair of stepped portions 134 are joined and fixed to the lower surface of the floor panel 14 and the lower surfaces of the pair of flange portions 126 of the inner member 122 shown in FIG. 2. Furthermore, the outer member 123 and the inner member 122 form the reinforcing member 102 by being joined and fixed to each other.

The reinforcing member 102 forms a closed cross-sectional structure part 146 as a small skeleton, which is smaller than the closed cross-sectional structure part 145, together with the base plate portion 48 of the floor panel 14 as shown in FIGS. 3 and 7. As shown in FIG. 10A, the rear end portion of the reinforcing member 102, which is formed of the inner member 122, is connected to the wall plate portion 111 of the reinforcing member 101 and the wall plate portion 141 of the reinforcing member 103. Accordingly, the rear end portions of both the reinforcing member 102 and the closed cross-sectional structure part 146 formed by the reinforcing member 102 are connected to the reinforcing member 101 and the closed cross-sectional structure part 145 formed by the reinforcing member 101 and the reinforcing member 103 and the closed cross-sectional structure part 147 formed by the reinforcing member 103. In other words, the rear end portions of both the reinforcing member 102 and the closed cross-sectional structure part 146 are connected to a corner portion between the reinforcing members 101 and 103 and a corner portion between the closed cross-sectional structure parts 145 and 147. As a result, the rear end portions of both the reinforcing member 103 and the closed cross-sectional structure part 147 are connected to a corner portion between the reinforcing members 101 and 102 and a corner portion between the closed cross-sectional structure parts 145 and 146.

The front end portion of the reinforcing member 102, which is formed of the outer member 123, is connected to the base plate portion 56 and the wall plate portion 58 of the outrigger 17, the front side frame 67, and the lower wall plate portion 43 and the bottom plate portion 42 of the tunnel frame 13. Accordingly, the front end portions of both the reinforcing member 102 and the closed cross-sectional structure part 146 formed by the reinforcing member 102 are connected to the front end portion of the vehicle body skeleton part 54 that is formed by the tunnel frame 13, the vehicle body skeleton part 64 that is formed by the outrigger 17, and the rear end portion of the vehicle body skeleton part 69 that is formed by the front side frame 67. That is, all of the reinforcing member 102 and the closed cross-sectional structure part 146 connect portions of the vehicle body skeleton parts 54, 64, and 69, which form the front end of the floor body 11, to the middle portion of the reinforcing member 101, that is, the middle portion of the closed cross-sectional structure part 145. Further, the rear end portion of the reinforcing member 102 is connected to a center portion of the reinforcing member 101 in the lengthwise direction of the reinforcing member.

Figure 11:
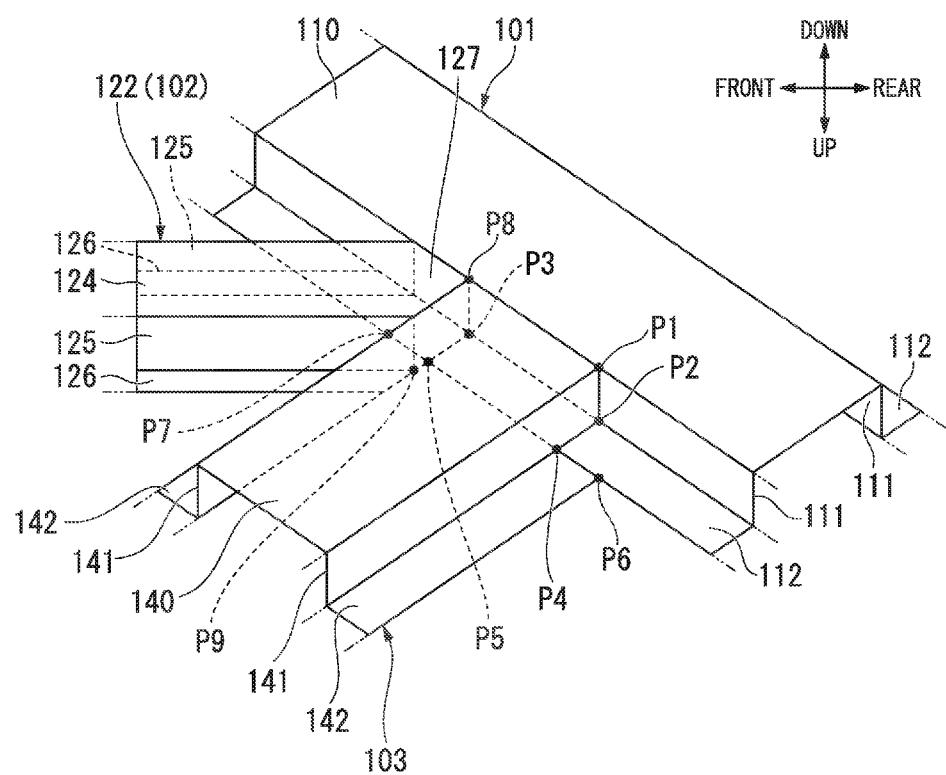
FIG. 11 is a perspective view illustrating welding points of the reinforcing portion of the vehicle body floor structure according to the first embodiment of the invention.

Meanwhile, the inner member 122 of the reinforcing member 102 and the reinforcing member 103 are joined and fixed to the reinforcing member 101 by MIG welding. In this case, for example, as shown in FIG. 11, welding is performed at a position where an edge portion of the main plate portion 110 of the reinforcing member 101 corresponding to one wall plate portion 111 and an end portion of the edge portion of the main plate portion 140 of the reinforcing member 103 opposite to the inner member 122 come into contact with each other as a welding point P1. Further, welding is performed at two positions where an edge portion of one wall plate portion 111 of the reinforcing member 101 opposite to the main plate portion 140 and end portions of the edge portions of the pair of wall plate portions 141 of the reinforcing member 103 opposite to the main plate portion 140 come into contact with each other as welding points P2 and P3. Furthermore, welding is performed at two positions where an edge portion of one flange portion 112 of the reinforcing member 101 opposite to the wall plate portion 111 and end portions of the edge portions of the pair of flange portions 142 of the reinforcing member 103 corresponding to the respective wall plate portions 141 come into contact with each other as welding points P4 and P5. Moreover, welding is performed at two positions where an edge portion of one flange portion 112 of the reinforcing member 101 opposite to the wall plate portion 111 and end portions of the edge portions of the pair of flange portions 142 of the reinforcing member 103 opposite to the respective wall plate portions 141 come into contact with each other as welding points P6 and P7.

Further, welding is performed at a position where an edge portion of the main plate portion 110 of the reinforcing member 101 corresponding to one wall plate portion 111, an end portion of the edge portion of the main plate portion 140 of the reinforcing member 103 corresponding to the inner member 122, and a tip of the pointed portion 127 of the inner member 122 come into contact with each other as a welding point P8. Furthermore, welding is performed at a position where an edge portion of one flange portion 142 of the reinforcing member 103 corresponding to the wall plate portion 141 and an end portion of the edge portion of one wall plate portion 125 of the inner member 122 corresponding to the flange portion 126 come into contact with each other as a welding point P9.

According to the vehicle body floor structure of this embodiment having been described above, it is possible to suppress deformation that occurs at the time of a narrow offset collision. That is, when a vehicle is subjected to a narrow offset collision, a collision load is input to the vehicle body floor 100 through the front wheel 74 toward the center side of the vehicle width direction in a direction that is inclined rearward from the outside in the vehicle width direction as shown in FIG. 12A by an arrow A1. However, this collision load is dispersed to the side sill 12 that is a vehicle body skeleton part, the vehicle body skeleton part 64 that is formed by the outrigger 17, and the reinforcing member 101, that is, the closed cross-sectional structure part 145 of which one end is connected to the corner portion between the side sill 12 and the vehicle body skeleton part 64. In this case, the load applied to the reinforcing member 101, that is, the closed cross-sectional structure part 145, which is formed along a direction where the collision load is input (in other words, supports a narrow input), is increased. However, the collision load input to the reinforcing member 101, that is, the closed cross-sectional structure part 145 is dispersed to the vehicle body skeleton parts 54 and 83 from the corner portion, to which the other end of the reinforcing member 101, that is, the closed cross-sectional structure part 145 is connected, between the vehicle body skeleton part 54 formed by the tunnel frame 13 and the vehicle body skeleton part 83 formed by the floor cross member 18. Accordingly, it is possible to suppress the deformation of the floor body 11 that is caused by the collision load. Meanwhile, FIGS. 12A and 12B are views schematically shown for the understanding of FIG. 1. Since the connecting portion 72, which connects the rear end portion of the sub-frame 71 to the rear end portion of the front side frame 67, is provided in FIG. 1, loads A2 and A3 of a frontal collision shown in FIG. 12A overlap at the same position in the vehicle width direction. FIG. 12A shows a general purpose structure where a connecting portion 72' of the rear end portion of the sub-frame 71 is provided on the tunnel frame 13, that is, the vehicle body skeleton part 54 so as to be shifted inward relative to the rear end portion of the front side frame 67 in the vehicle width direction as shown in FIG. 1 as a connecting portion 72'.

Further, even though a collision load is large and the reinforcing member 101, that is, the closed cross-sectional structure part 145 is deformed in a direction crossing the extension direction thereof, the reinforcing member 102, that is, the closed cross-sectional structure part 146 connecting the portions of the vehicle body skeleton parts 54, 64, and 69, which form the front end of the floor body 11, to the middle portion of the reinforcing member 101, that is, the middle portion of the closed cross-sectional structure part 145 suppresses the bending deformation in both a tensile direction and a compression direction. Accordingly, the yield strength of the reinforcing member 101, that is, the closed cross-sectional structure part 145 is increased, so that it is possible to increase the amount of energy to be absorbed. Meanwhile, if the reinforcing member 102, that is, the closed cross-sectional structure part 146 is connected to at least one of the portions of the vehicle body skeleton parts 54, 64, and 69 that form the front end of the floor body 11, it is possible to suppress the deformation of the reinforcing member 101, that is, the closed cross-sectional structure part 145.

Furthermore, even though the reinforcing member 101, that is, the closed cross-sectional structure part 145 is to be deformed in the direction crossing the extension direction thereof, the reinforcing member 103, that is, the closed cross-sectional structure part 147, which connects the corner portion between the reinforcing members 101 and 102, that is, the corner portion between the closed cross-sectional structure parts 145 and 146 to the vehicle body skeleton part 54 formed by the tunnel frame 13, suppresses the bending deformation in both the tensile direction and the compression direction together with the reinforcing member 102, that is, the closed cross-sectional structure part 146.

Accordingly, the yield strength of the reinforcing member 101, that is, the closed cross-sectional structure part 145 is further increased. Therefore, it is possible to further suppress deformation that occurs at the time of a narrow offset collision.

Moreover, since the reinforcing member 103 and the closed cross-sectional structure part 147 formed by the reinforcing member 103 are connected to the reinforcing member 101 and the closed cross-sectional structure part 145 formed by the reinforcing member 101 so as to be orthogonal to the reinforcing member 101 and the closed cross-sectional structure part 145, an effect of suppressing the deformation of the reinforcing member 101, that is, the closed cross-sectional structure part 145 is high. Meanwhile, the number or the angles of the reinforcing members 102 and 103 may be appropriately changed, and a manufacturing process is also easily modified.

In more detail, the reinforcing members 101 to 103 can form a large triangular closed cross-sectional truss structure part T1 that is formed by a portion of the vehicle body skeleton part 69 forming the front end of the floor body 11, the vehicle body skeleton parts 54 and 64, and the reinforcing member 101; a medium-sized triangular closed cross-sectional truss structure part T2 that is formed by portions of the vehicle body skeleton parts 54, 64, and 69 forming the front end of the floor body 11 and the reinforcing members 101 and 103; a small triangular closed cross-sectional truss structure part T3 that is formed by the portions of the vehicle body skeleton parts 64, and 69 forming the front end of the floor body 11 and the reinforcing members 101 and 102; and a small triangular closed cross-sectional truss structure part T4 that is formed by the portions of the vehicle body skeleton parts 54 and 69 forming the front end of the floor body 11 and the reinforcing members 102 and 103.

For this reason, it is possible to effectively absorb energy against the load A2 input to a front portion of the vehicle body floor 100 from the connecting portion 72 of the sub-frame 71 and the load A3 input to the front portion of the vehicle body floor 100 from the front side frame 67, which are used in a method of evaluating a frontal collision of, for example, NCAP (New Car Assessment Program), and a load A4 input to the floor cross member 18 due to the lateral collision of the vehicle body floor 100. In addition, it is possible to effectively absorb energy against the input of loads in all directions including the load A1 that is caused by the above-mentioned narrow offset collision, a component force A5, which is applied to the side sill 12 in the fore and back direction, of the load caused by the narrow offset collision, and a component force A6 (FIG. 12B) that is applied due to the narrow offset collision by the front wheel 74 so as to deform the corner portion of the front portion of the vehicle body floor 100 toward the upper side (or lower side). Accordingly, it is possible to effectively absorb energy against various actual collision forms. As a result, it is possible to reduce the weight of the vehicle body as compared to a case where the same performance is obtained by a method in the related art. That is, since it is possible to remove a floor frame that is provided between the side sill 12 and the tunnel frame 13 so as to extend in the fore and back direction, it is possible to reduce the weight of the vehicle body skeleton part 64 that is formed by the outrigger 17 formed at the front end portion of the floor body 11 along the vehicle width direction, the rear end portion of the vehicle body skeleton part 69 that is formed by the front side frame 67, the front end portion of the vehicle body skeleton part 54 that is formed by the tunnel frame 13, and the like.

Further, the reinforcing member 102, that is, the closed cross-sectional structure part 146 is connected to the rear end portion of the front side frame 67 extending forward from the floor body 11, that is, the vehicle body skeleton part 69. For this reason, it is possible to input a force, which is applied to the front portion of the floor body 11 from the front side frame 67 at the time of a frontal collision, to the middle portion of the reinforcing member 101, that is, the closed cross-sectional structure part 145 from the reinforcing member 102, that is, the closed cross-sectional structure part 146 that is formed along the direction where the load is input, and to disperse the load to the vehicle body skeleton part 54, which is formed by the tunnel frame 13, and the vehicle body skeleton part 83, which is formed by the floor cross member 18, through the reinforcing member 101, that is, the closed cross-sectional structure part 145. Accordingly, since it is possible to reduce a load transmitted to the side sill 12 from the front side frame 67, that is, the vehicle body skeleton part 69 through the vehicle body skeleton part 64 that is formed by the outrigger 17, it is possible to reduce the strength of the outrigger 17. As a result, a reduction in weight is achieved.

Moreover, the reinforcing member 102, that is, the closed cross-sectional structure part 146 is connected to the vehicle body skeleton part 69 that is provided with the connecting portion 72 of the sub-frame 71 supporting the lower arm 76 of the suspension device 75 for the front wheel 74. For this reason, it is possible to input a load, which is applied to the front portion of the floor body 11 from the sub-frame 71 at the time of a frontal collision, to the middle portion of the reinforcing member 101, that is, the closed cross-sectional structure part 145 from the reinforcing member 102, that is, the closed cross-sectional structure part 146 that is formed along the direction where the load is input, and to disperse the load to the vehicle body skeleton part 54, which is formed by the tunnel frame 13, and the vehicle body skeleton part 83, which is formed by the floor cross member 18, through the reinforcing member 101, that is, the closed cross-sectional structure part 145. Accordingly, since it is possible to reduce a load transmitted to the side sill 12 from the vehicle body skeleton part 69, which is provided with the connecting portion 72 of the sub-frame 71, through the outrigger 17, that is, the vehicle body skeleton part 64, it is possible to reduce the strength of the outrigger 17. As a result, a reduction in weight is achieved. In addition, since the rear end portion of the front side frame 67, that is, the vehicle body skeleton part 69 and the connecting portion 72 of the sub-frame 71 correspond to each other in the vehicle width direction, it is possible to disperse a load of a frontal collision well.

Further, since the reinforcing member 102, that is, the closed cross-sectional structure part 146 is connected to a center portion of the reinforcing member 101, that is, the closed cross-sectional structure part 145, it is possible to further increase the stiffness of the reinforcing member 101, that is, the closed cross-sectional structure part 145 where the load of a narrow offset collision is large.

Here, when the connecting portion 72' of the rear end portion of the sub-frame 71 is provided on the tunnel frame 13, that is, the vehicle body skeleton part 54 so as to be shifted inward relative to the rear end portion of the front side frame 67 in the vehicle width direction as shown in FIG. 1 as a connecting portion 72', the reinforcing member 103, that is, the closed cross-sectional structure part 147 may be provided so as to connect the connecting portion 72' of the sub-frame 71 to the middle portion of the reinforcing member 101, that is, the closed cross-sectional structure part 145. According to this structure, it is possible to input a load, which is applied to the front portion of the floor body 11 from the sub-frame 71 at the time of a frontal collision, to the middle portion of the reinforcing member 101, that is, the closed cross-sectional structure part 145 from the reinforcing member 103, that is, the closed cross-sectional structure part 147, and to disperse the load to the vehicle body skeleton part 54, which is formed by the tunnel frame 13, and the vehicle body skeleton part 83, which is formed by the floor cross member 18, through the reinforcing member 101, that is, the closed cross-sectional structure part 145.

Figure 13:
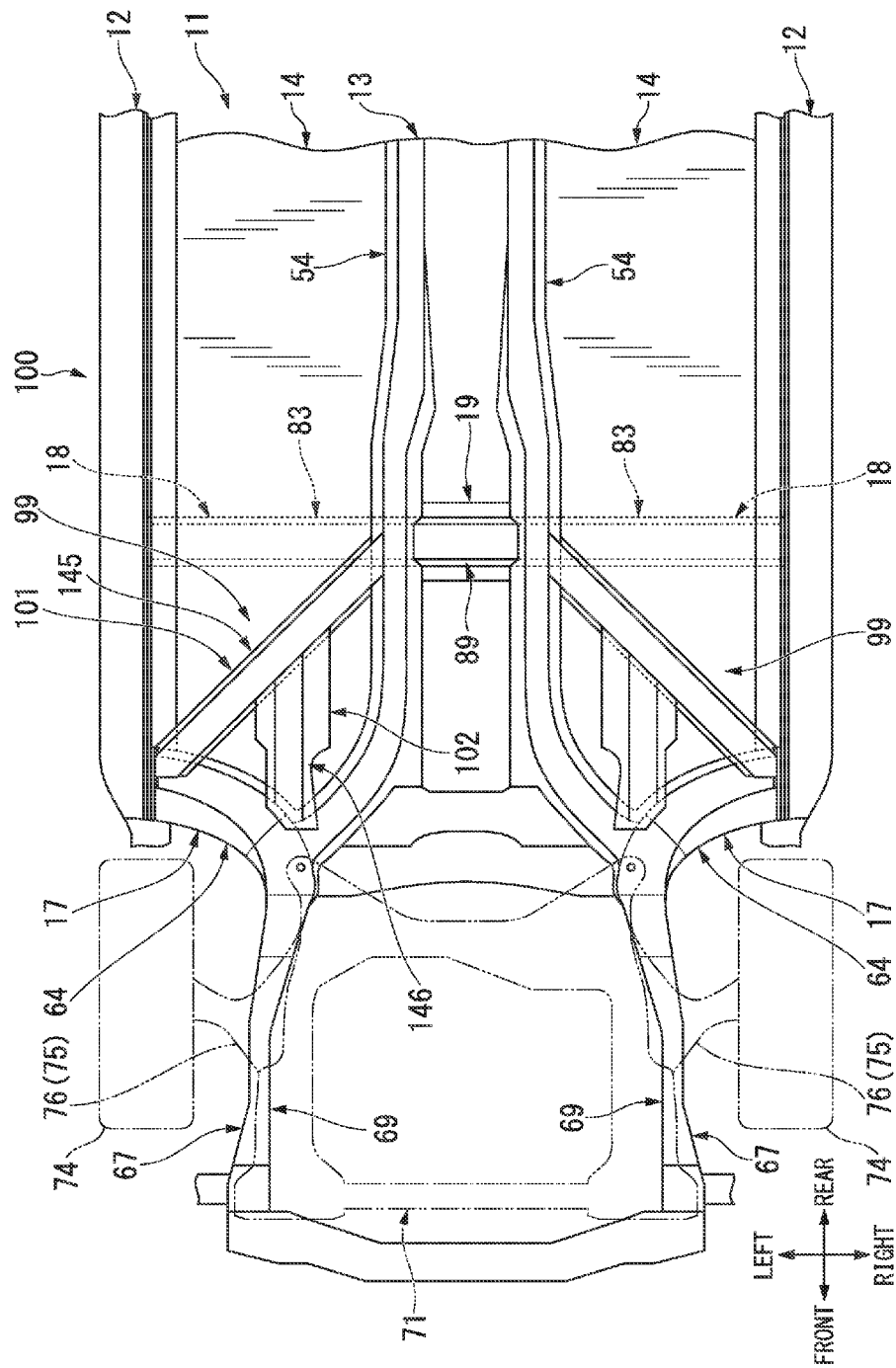
FIG. 13 is a view of a modification of the vehicle body floor structure according to the first embodiment of the invention when seen from below.

Meanwhile, it is possible to cope with a case where the front side frame 67, that is, the vehicle body skeleton part 69 or the connecting portion 72, which is a mount point of the sub-frame 71, varies according to the type of a vehicle, by employing the above-mentioned structure or a substantially Y-shaped structure where, for example, the reinforcing member 103, that is, the closed cross-sectional structure part 147 are removed and the reinforcing portion 99 is formed of the reinforcing member 101, that is, the closed cross-sectional structure part 145 and the reinforcing member 102, that is, the closed cross-sectional structure part 146 as shown in FIG. 13. When the reinforcing portion 99 has a Y-like shape that is formed by the reinforcing member 101, that is, the closed cross-sectional structure part 145 and the reinforcing member 102, that is, the closed cross-sectional structure part 146 as described above, it is possible to suppress the increase of the weight of the reinforcing portion 99.

Figure 14:
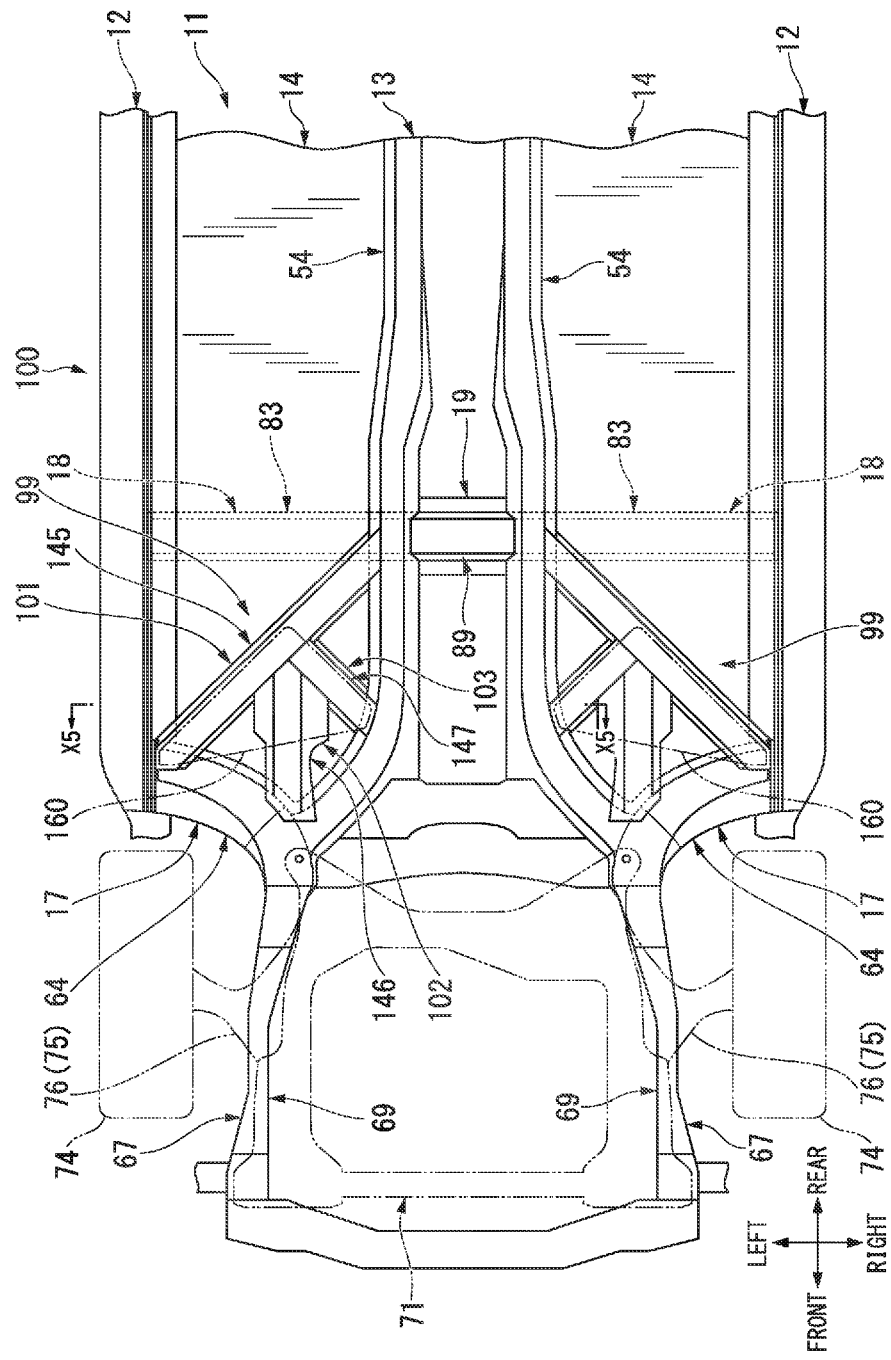
FIG. 14 is a view of another modification of the vehicle body floor structure according to the first embodiment of the invention when seen from below.
Figure 15:
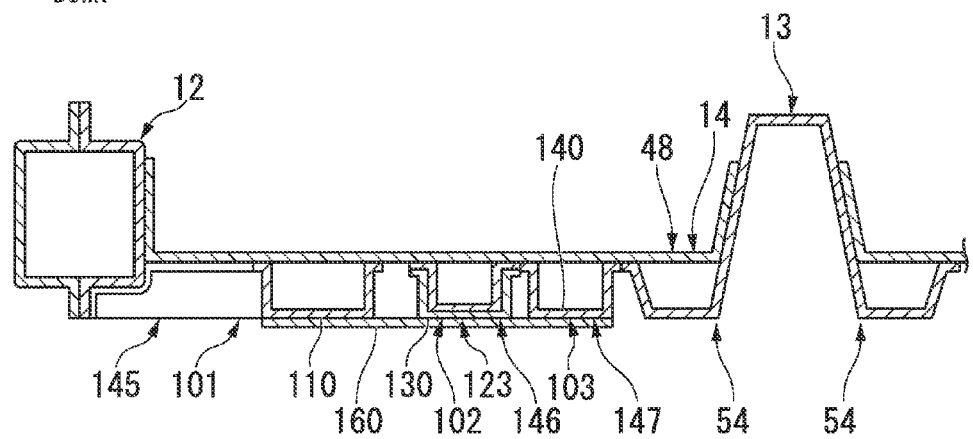
FIG. 15 is a cross-sectional view taken along line X5-X5 of FIG. 14.

Alternatively, as shown in FIGS. 14 and 15, the reinforcing portion 99 may employ a structure where the reinforcing member 101, that is, that closed cross-sectional structure part 145, the reinforcing member 102, that is, the closed cross-sectional structure part 146, and the reinforcing member 103, that is, the closed cross-sectional structure part 147 are connected to each other by a connection panel 160 that forms a double-floor structure together with the floor body 11. In this case, as shown in FIG. 15, the connection panel 160 is joined and fixed to the lower surface of the main plate portion 110 of the reinforcing member 101, the lower surface of the main plate portion 130 of the outer member 123 of the reinforcing member 102, and the lower surface of the main plate portion 140 of the reinforcing member 103 so as to connect these. According to this structure, the cross-sectional area of the closed cross-sectional truss structure part T2 shown in FIG. 12A is increased. Accordingly, it is possible to increase yield strength against a collision load that is generated at the time of a frontal collision and is applied to the front portion of the floor body 11 from the front side frame 67, that is, the vehicle body skeleton part 69 or the connecting portion 72 of the sub-frame 71 and to reinforce the vicinity of a collision portion at the time of a narrow offset collision. In this case, since the double-floor structure allows the cross-sectional area to be gradually reduced toward the rear side from the front side, the double-floor structure widely absorbs a load in the vehicle width direction at the initial stage of collision and gradually reduces the absorption of the load toward the rear side in the fore and back direction. Accordingly, the double-floor structure can continue the generation of a reaction force.

When the connection panel 160 is provided in this way, the reinforcing member 103, that is, the closed cross-sectional structure part 147 may be removed as shown in FIG. 13. Even though the reinforcing member 103, that is, the closed cross-sectional structure part 147 is removed in this way, it is possible to obtain the same reaction force as a case where the reinforcing member 103, that is, the closed cross-sectional structure part 147 is provided. Accordingly, it is possible to achieve a reduction in weight as compared to a case where the reinforcing member 103 is provided. Further, the reinforcing member 103 generates a reaction force only until being broken, but the generation of a reaction force can be continued since the double-floor structure is provided.

In the above-mentioned embodiment, the reinforcing portion 99 is provided on the lower surface of the floor body 11. However, the reinforcing portion 99 may be provided on the upper surface of the floor body 11.

A vehicle body floor structure according to a second embodiment of the invention will be described referring to the drawings. The vehicle body floor structure according to this embodiment is a vehicle body floor structure for a four-wheeled vehicle. Meanwhile, elements common to the above-mentioned embodiment will be denoted by the same reference numerals, and the detailed description thereof will be omitted.

Figure 16:
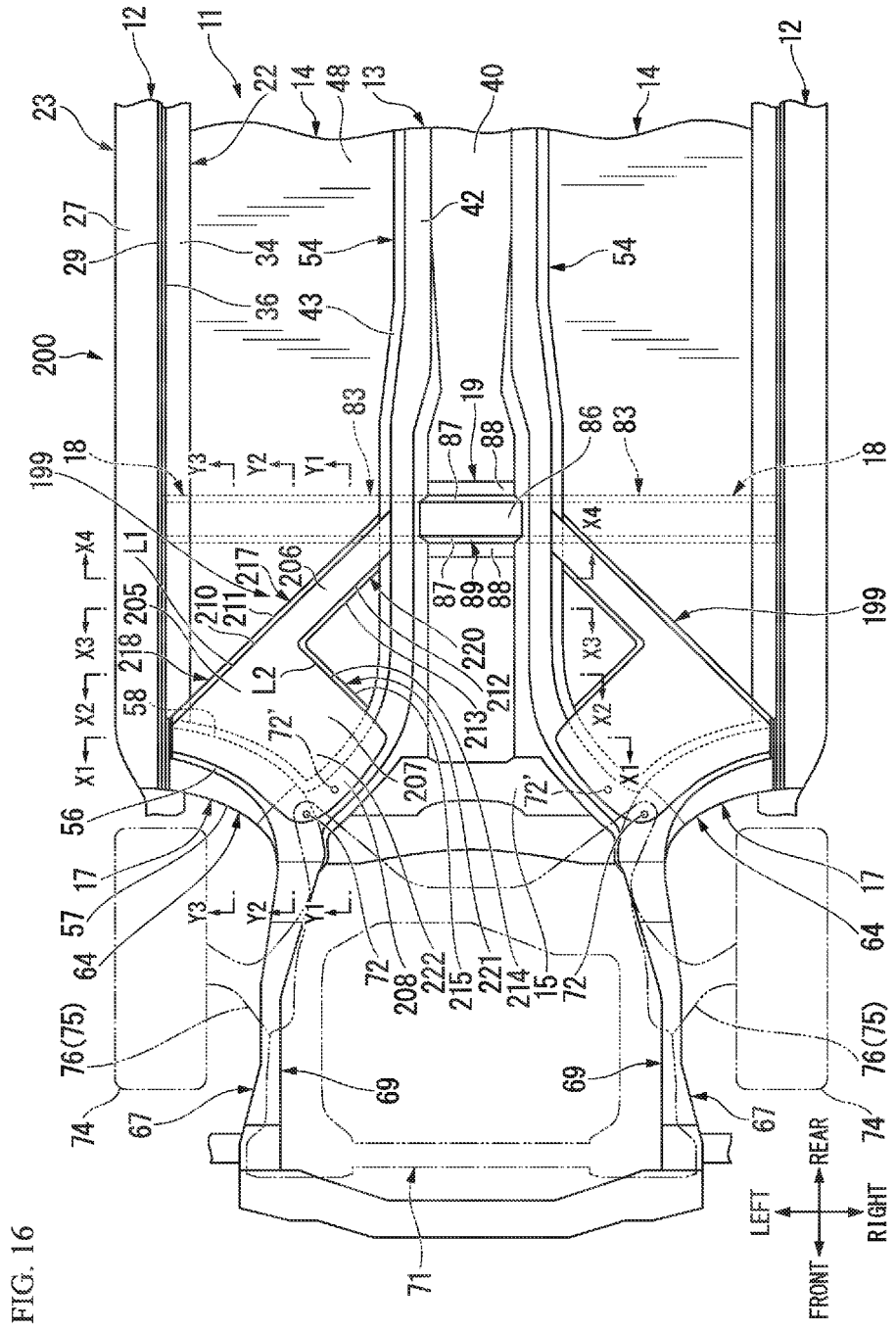
FIG. 16 is a view of a vehicle body floor structure according to a second embodiment of the invention when seen from below.
Figure 17:
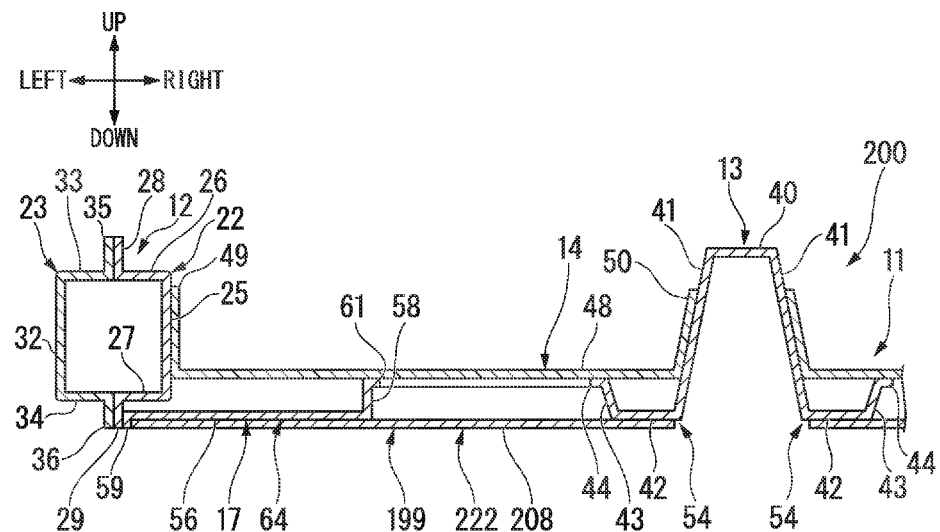
FIG. 17 is a cross-sectional view taken along line X1-X1 of FIG. 16.
Figure 18:
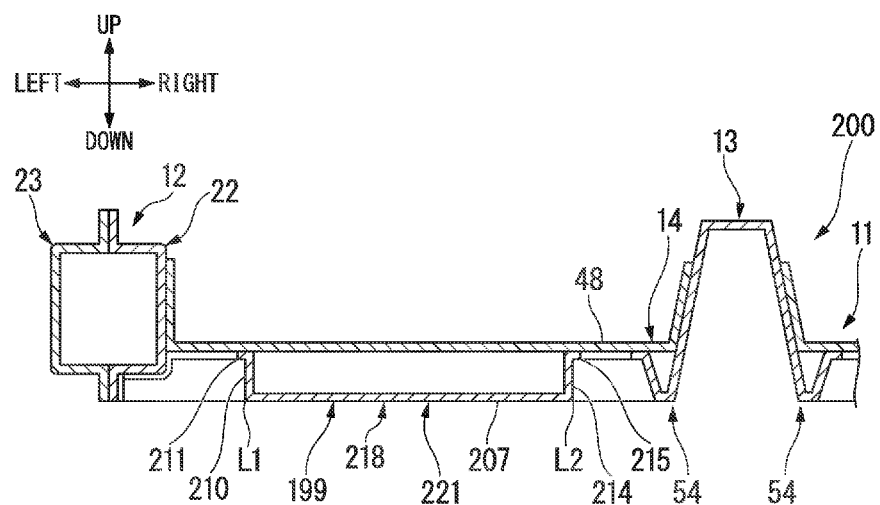
FIG. 18 is a cross-sectional view taken along line X2-X2 of FIG. 16.
Figure 19:
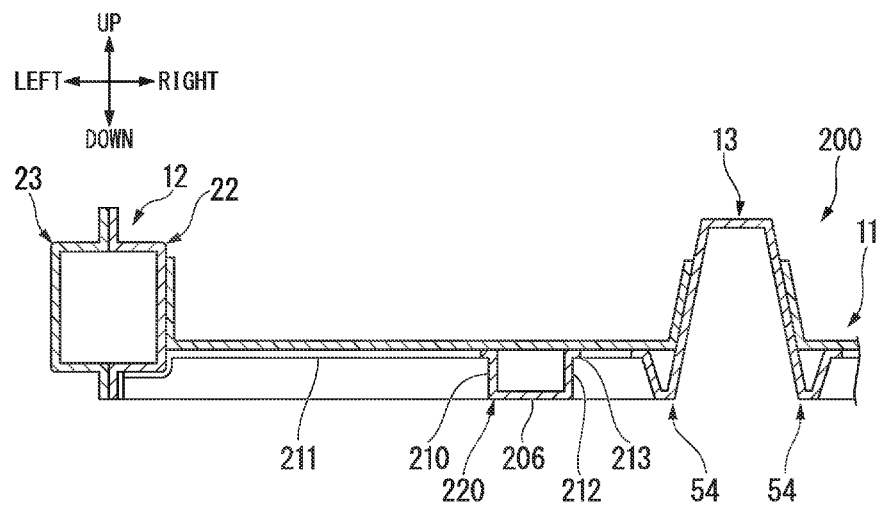
FIG. 19 is a cross-sectional view taken along line X3-X3 of FIG. 16.
Figure 20:
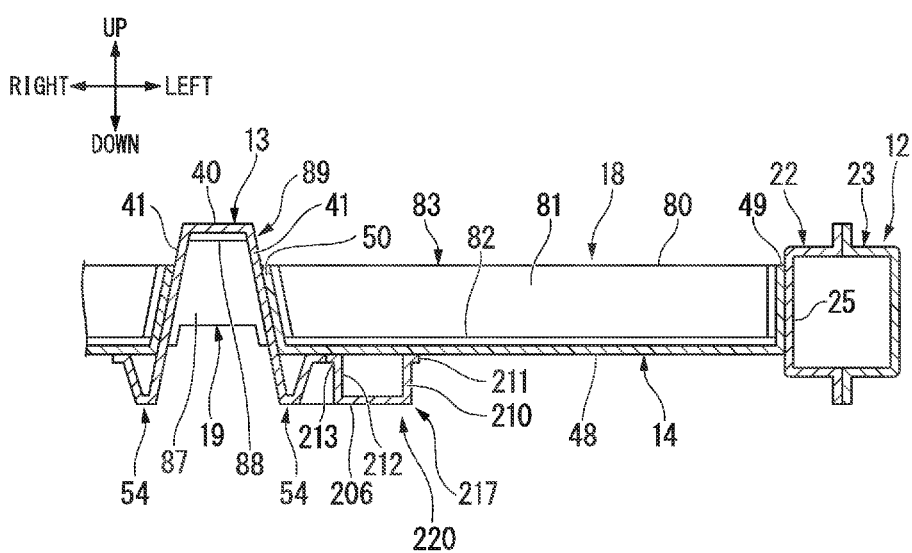
FIG. 20 is a cross-sectional view taken along line X4-X4 of FIG. 16.
Figure 21:
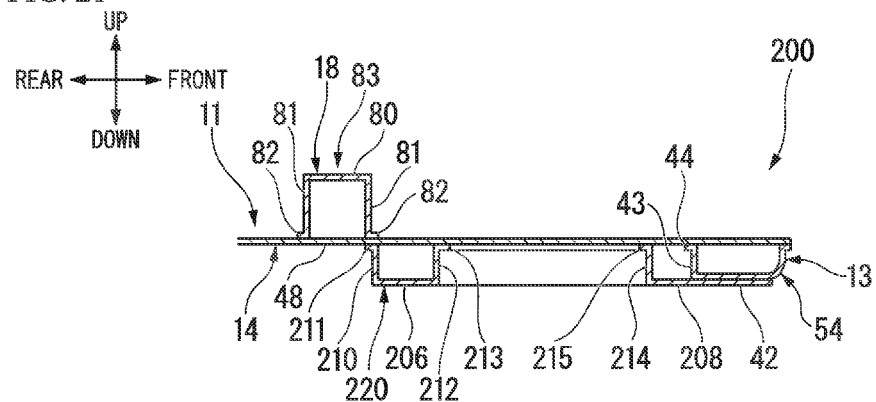
FIG. 21 is a cross-sectional view taken along line Y1-Y1 of FIG. 16.
Figure 22:
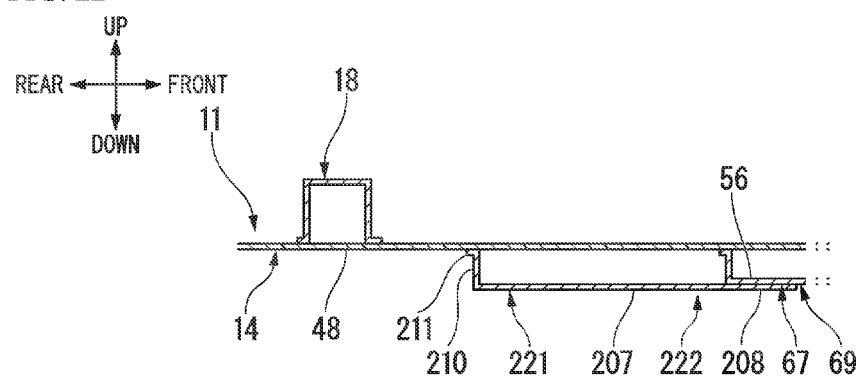
FIG. 22 is a cross-sectional view taken along line Y2-Y2 of FIG. 16.
Figure 23:
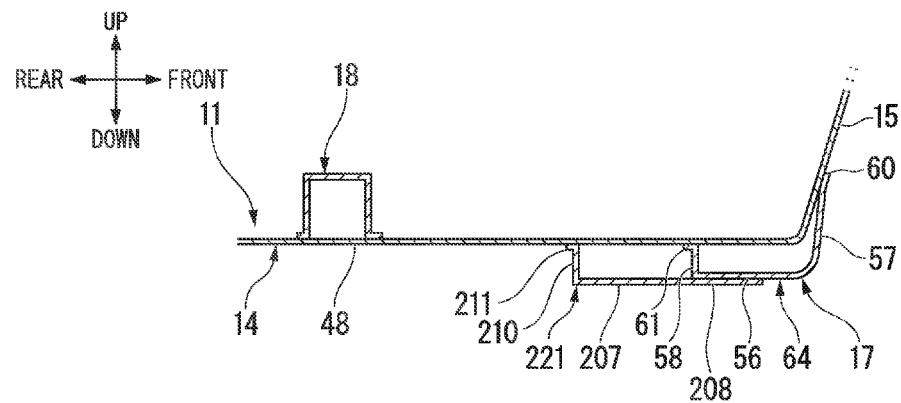
FIG. 23 is a cross-sectional view taken along line Y3-Y3 of FIG. 16.

As shown in FIG. 16, in the vehicle body floor structure according to this embodiment, a pair of reinforcing members (reinforcing portions) 199 are mounted on the front portion of the floor body 11 having the above-mentioned structure, so that a vehicle body floor 200 is formed.

Figure 24:
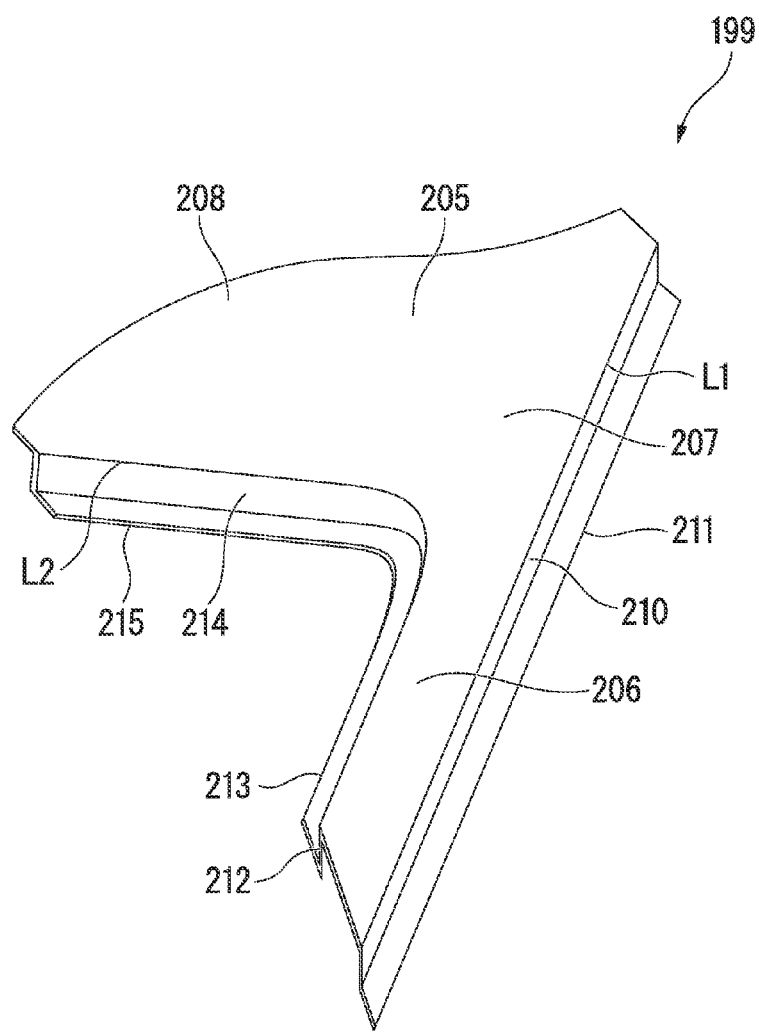
FIG. 24 is a perspective view of a reinforcing portion of the vehicle body floor structure according to the second embodiment of the invention.

The reinforcing member 199 is formed by pressing of, for example, one plate member, and includes a base plate portion 205 that is formed of a flat surface of which the area is largest as shown in FIG. 24. The base plate portion 205 includes a strip plate portion 206 that is linearly formed so as to be elongated in one direction, a wide plate portion 207 that extends from the extension of the strip plate portion 206 toward one side in the width direction of the strip plate portion 206 so as to have a substantially triangular shape, and a front plate portion 208 that extends from the wide plate portion 207 toward the side opposite to the strip plate portion 206. The edge portion of the wide plate portion 207 close to the strip plate portion 206 is orthogonal to the extension direction of the strip plate portion 206.

Further, the reinforcing member 199 includes a wall plate portion 210 that extends substantially perpendicular to the base plate portion 205 from one edge portion of the strip plate portion 206 and one edge portion of the wide plate portion 207 disposed on the same straight line, a flange portion 211 that extends in the direction opposite to the base plate portion 205 from an edge portion of the wall plate portion 210 opposite to the base plate portion 205 so as to be substantially parallel to the base plate portion 205, a wall plate portion 212 that extends substantially perpendicular to the base plate portion 205 from the other end portion of the strip plate portion 206, and a flange portion 213 that extends in the direction opposite to the base plate portion 205 from an edge portion of the wall plate portion 212 opposite to the base plate portion 205 so as to be parallel to the base plate portion 205. Furthermore, the reinforcing member 199 includes a wall plate portion 214 that extends substantially perpendicular to the base plate portion 205 from an edge portion of the wide plate portion 207 close to the strip plate portion 206 and a flange portion 215 that extends in the direction opposite to the base plate portion 205 from an edge portion of the wall plate portion 214 opposite to the base plate portion 205 so as to be parallel to the base plate portion 205. The wall plate portions 210, 212, and 214 are disposed on the same side relative to the base plate portion 205. The wall plate portions 212 and 214 are continued so as to be orthogonal to each other, and the flange portions 213 and 215 are also continued so as to be orthogonal to each other.

As shown in FIG. 16, the reinforcing member 199 is disposed so that the base plate portion 205 is substantially horizontal and the front plate portion 208 is joined and fixed to the lower surface of the base plate portion 56 of the outrigger 17, the lower surface of the front side frame 67, and the lower surface of the bottom plate portion 42 of the tunnel frame 13. Further, the strip plate portion 206 of the reinforcing member 199 is inclined so as to be positioned closer to the center side of the vehicle width direction toward the rear side, the rear end portion is joined and fixed to the lower wall plate portion 43 of the tunnel frame 13, and the wide plate portion 207 is joined and fixed to the lower surface of the bottom plate portion 42 of the tunnel frame 13. Furthermore, the flange portion 211 of the reinforcing member 199 is joined and fixed to the lower surface of the base plate portion 48 of the floor panel 14 and the lower surface of the lower plate portion 34 of the inner sill 22 of the side sill 12, and the flange portions 213 and 215 are joined and fixed to the lower surface of the base plate portion 48 of the floor panel 14.

A rear component part (rear part) 217, which includes the strip plate portion 206, a rear portion of the wall plate portion 210, a rear portion of the flange portion 211, the wall plate portion 212, and the flange portion 213 of the reinforcing member 199, has a hat-like cross-sectional shape having a substantially constant width; and the rear component part 217 and the base plate portion 48 of the floor panel 14 form a rear closed cross-sectional structure part 220 having a substantially constant width. Further, a front component part (front part) 218, which includes the wide plate portion 207, a front portion of the wall plate portion 210, a front portion of the flange portion 211, the wall plate portion 214, and the flange portion 215, has a hat-like cross-sectional shape of which the width is increased toward the front side; and the front component part 218, the base plate portion 48 of the floor panel 14, and the lower plate portion 34 of the inner sill 22 form a front closed cross-sectional structure part 221 of which the width is increased toward the front side. Furthermore, the front plate portion 208, the wall plate portion 58 of the outrigger 17, a front end portion of the lower wall plate portion 43 of the tunnel frame 13, and the base plate portion 48 of the floor panel 14 form a front end closed cross-sectional structure part 222 of which the width is reduced toward the front side. The rear closed cross-sectional structure part 220, the front closed cross-sectional structure part 221, and the front end closed cross-sectional structure part 222 are continued.

An outer portion of the reinforcing member 199 in the vehicle width direction is connected to the outrigger 17 and the side sill 12 as described above. Accordingly, the outer portions of both the reinforcing member 199 and the front closed cross-sectional structure part 221, which is formed by the reinforcing member 199 and of which the width is increased, in the vehicle width direction are connected to the vehicle body skeleton part 64 that is formed by the outrigger 17 and the side sill 12 that serves as a vehicle body skeleton part.

In other words, since they are connected to a corner portion between the outrigger 17 and the side sill 12, the outer portions of both the reinforcing member 199 and the front closed cross-sectional structure part 221 in the vehicle width direction are connected to a corner portion between the vehicle body skeleton part 64 formed by the outrigger 17 and the side sill 12. Meanwhile, the outer portion of the reinforcing member 199 in the vehicle width direction may be connected to any one of the front portion of the side sill 12 and the outer portion of the outrigger 17 in the vehicle width direction.

Further, since an inner portion of the front portion of the reinforcing member 199 in the vehicle width direction is connected to the front portion of the tunnel frame 13, the inner portions of both the reinforcing member 199 and the front closed cross-sectional structure part 221 formed by the reinforcing member 199 are connected to the front portion of the vehicle body skeleton part 54 formed by the tunnel frame 13.

Furthermore, since the front end portion of the reinforcing member 199 is connected to the front end portion of the tunnel frame 13, the rear end portion of the front side frame 67, and the outrigger 17, the reinforcing member 199 and the front end closed cross-sectional structure part 222 formed by the reinforcing member 199 are connected to the front end portion of the vehicle body skeleton part 54 formed by the tunnel frame 13, the rear end portion of the vehicle body skeleton part 69 formed by the front side frame 67, and the vehicle body skeleton part 64 formed by the outrigger 17. Meanwhile, the reinforcing member 199 is also connected to the connecting portion 72 of the sub-frame 71.

Moreover, since the rear end portion of the reinforcing member 199 is connected to the lower wall plate portion 43 of the tunnel frame 13, the rear end portions of both the reinforcing member 199 and the closed cross-sectional structure part 220 formed by the reinforcing member 199 are connected to the vehicle body skeleton part 54 formed by the tunnel frame 13. Here, since the rear end portion of the reinforcing member 199 overlaps the floor cross member 18 in plan view, the rear end portions of the reinforcing member 199 and the rear closed cross-sectional structure part 220 are also connected to the vehicle body skeleton part 83 formed by the floor cross member 18. In other words, the rear end portions of the reinforcing member 199 and the rear closed cross-sectional structure part 220 are connected to a corner portion between the vehicle body skeleton part 54 that is formed by the tunnel frame 13 and the vehicle body skeleton part 83 that is formed by the floor cross member 18.

As described above, among the closed cross-sectional structure parts 220 to 222 formed by the reinforcing member 199, first of all, the rear closed cross-sectional structure part 220 obliquely extends forward from the vehicle body skeleton part 54, which is formed by the tunnel frame 13, toward the corner portion between the vehicle body skeleton part 64 formed by the outrigger 17 and the side sill 12; the front closed cross-sectional structure part 221 subsequently extends while the width thereof is increased toward the front side so as to be connected to the outer portion of the vehicle body skeleton part 64, which is formed by the outrigger 17, in the vehicle width direction, the front portion of the side sill 12, and the front portion of the vehicle body skeleton part 54 formed by the tunnel frame 13; and the front end closed cross-sectional structure part 222 is subsequently connected to the middle portion of the vehicle body skeleton part 64, the inner portion of the vehicle body skeleton part 64 in the vehicle width direction, the front end portion of the vehicle body skeleton part 54, and the rear end portion of the vehicle body skeleton part 69 formed by the front side frame 67.

Accordingly, the reinforcing member 199 obliquely connects the outer portion of the vehicle body skeleton part 64, which is formed by the outrigger 17, in the vehicle width direction, the front portion of the side sill 12, and the vehicle body skeleton part 54, which is formed by the tunnel frame 13, so as to be positioned closer to the center side of the vehicle width direction toward the rear side; and the front portion of the reinforcing member 199 extends while the width thereof is increased toward the front side so as to form a double-floor structure together with the floor body 11. Further, the front component part 218, of which the width is increased toward the front side, of the reinforcing member 199 extends toward only the center side of the vehicle width direction on the extended line of the rear component part 217 extending in a direction where the outer portion of the vehicle body skeleton part 64, which is formed by the outrigger 17, in the vehicle width direction, the front portion of the side sill 12, and the vehicle body skeleton part 54 formed by the tunnel frame 13 are connected to each other.

Figure 25:
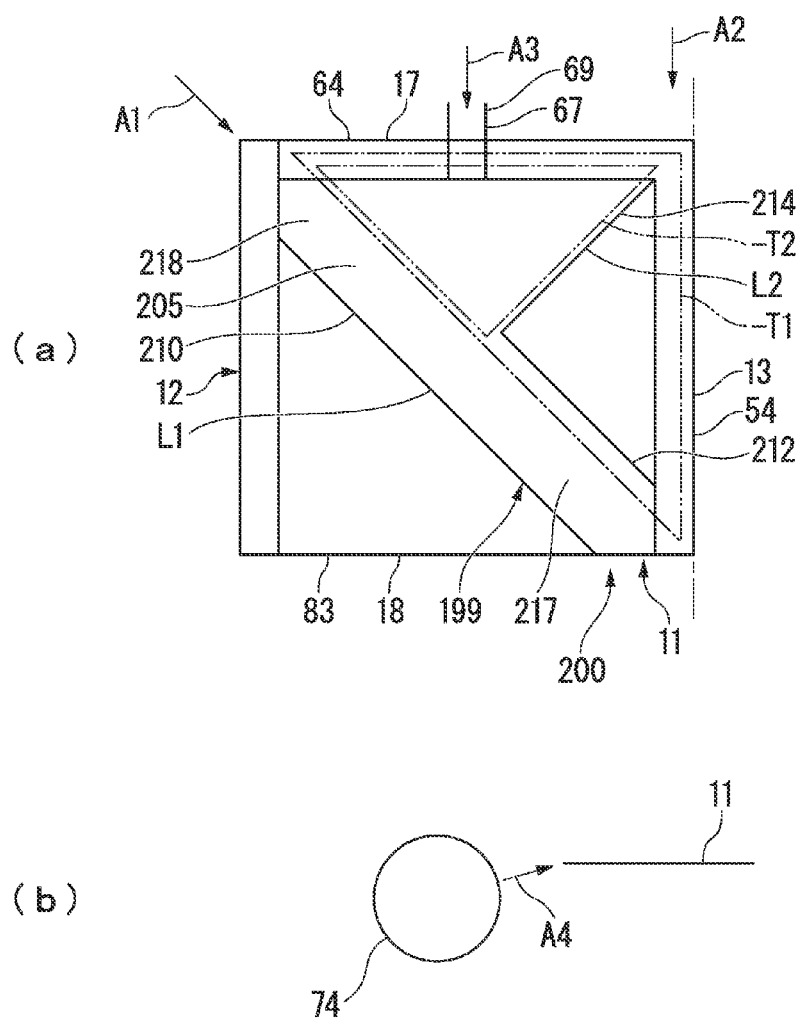
FIG. 25A is a conceptual diagram illustrating the directions of loads input to the vehicle body floor structure according to the second embodiment of the invention.
FIG. 25B is a conceptual diagram illustrating the directions of loads input to the vehicle body floor structure according to the second embodiment of the invention.

According to the vehicle body floor structure of this embodiment having been described above, it is possible to suppress deformation that occurs at the time of a narrow offset collision. That is, when a vehicle is subjected to a narrow offset collision, a collision load is input to the vehicle body floor 200 through the front wheel 74 toward the center side of the vehicle width direction in a direction that is inclined rearward from the outside in the vehicle width direction as shown in FIG. 25A by an arrow A1. However, this collision load is dispersed to the side sill 12 that is a vehicle body skeleton part, the vehicle body skeleton part 64 that is formed by the outrigger 17, and the reinforcing member 199 that are connected to these. In this case, since the base plate portion 205 and the wall plate portion 210 of the reinforcing member 199 form a ridge L1 that is formed along a direction where a load is input, the input load is transmitted to a corner portion, to which the other end of the reinforcing member 199 is connected and which is formed between the vehicle body skeleton part 54 formed by the tunnel frame 13 and the vehicle body skeleton part 83 formed by the floor cross member 18, along the ridge L1 and is dispersed to these vehicle body skeleton parts 54 and 83. Accordingly, it is possible to suppress the deformation of the floor body 11 that is caused by the collision load. Meanwhile, FIGS. 25A and 25B are views schematically shown for the understanding of FIG. 16 (also the same as FIG. 26 to be described below). Since the connecting portion 72, which connects the rear end portion of the sub-frame 71 to the rear end portion of the front side frame 67, is provided in FIG. 16, loads A2 and A3 of a frontal collision shown in FIG. 25A overlap at the same position in the vehicle width direction. FIG. 25A shows a general purpose structure where a connecting portion 72' of the rear end portion of the sub-frame 71 is provided on the tunnel frame 13, that is, the vehicle body skeleton part 54 so as to be shifted inward relative to the rear end portion of the front side frame 67 in the vehicle width direction as shown in FIG. 16 as a connecting portion 72'.

Further, even though a collision load is large and a portion of the reinforcing member 199, which is formed along a direction where a load is input and the ridge L1, is to be deformed in the direction crossing the extension direction thereof, the bending deformation is suppressed in both a tensile direction and a compression direction since a ridge L2 is formed by the base plate portion 205 and the wall plate portion 214 so as to connect the vehicle body skeleton part 54 to the middle portion of the reinforcing member 199. Accordingly, the yield strength of the reinforcing member 199 is increased, so that it is possible to increase the amount of energy to be absorbed. Therefore, it is possible to further suppress deformation that occurs at the time of a narrow offset collision.

Further, since the reinforcing member 199 has a hat-like cross-sectional shape, it is possible to reinforce the floor body 11 while suppressing an increase in weight.

Furthermore, since the width of the front portion of the reinforcing member 199 is increased toward the front side so that the front portion of the reinforcing member forms a double-floor structure together with the floor body 11, it is possible to generate a reaction force even against the load of a frontal collision that is applied to the front end of the floor body 11. In addition, the reinforcing member generates a reaction force only until being broken, but the generation of a reaction force can be continued since the double-floor structure is provided.

In more detail, it is possible to form the large triangular truss structure part T1 that is formed by a portion of the vehicle body skeleton part 69 forming the front end of the floor body 11, the vehicle body skeleton parts 54 and 64, and a portion of the reinforcing member 199 formed along the ridge L1; and the small truss structure part T2 that is formed by portions of the vehicle body skeleton parts 54, 64, and 69 forming the front end of the floor body 11 and a portion of the reinforcing member 199 formed along the ridge L2.

For this reason, it is possible to effectively absorb energy against a load A2 that is input to the front portion of the vehicle body floor 200 from the connecting portion 72 of the sub-frame 71, a load A3 that is input to the front portion of the vehicle body floor 200 from the front side frame 67, a load A1 that is caused by the above-mentioned narrow offset collision, and a component force A4 (FIG. 25B) that is applied due to the narrow offset collision by the front wheel 74 so as to deform the corner portion of the front portion of the vehicle body floor 200 toward the upper side (or lower side). Accordingly, it is possible to effectively absorb energy against various actual collision forms. As a result, it is possible to reduce the weight of the vehicle body as compared to a case where the same performance is obtained by a method in the related art. That is, since it is possible to remove a floor frame that is provided between the side sill 12 and the tunnel frame 13 so as to extend in the fore and back direction, it is possible to reduce the weight of the vehicle body skeleton part 64 that is formed by the outrigger 17 formed at the front end portion of the floor body 11 along the vehicle width direction, the rear end portion of the vehicle body skeleton part 69 that is formed by the front side frame 67, the front end portion of the vehicle body skeleton part 54 that is formed by the tunnel frame 13, and the like.

Further, the reinforcing member 199 is connected to the rear end portion of the front side frame 67 extending forward from the floor body 11, that is, the vehicle body skeleton part 69. For this reason, it is possible to disperse a load, which is input to the front portion of the floor body 11 from the front side frame 67 at the time of a frontal collision, to the vehicle body skeleton part 54, which is formed by the tunnel frame 13, and the vehicle body skeleton part 83, which is formed by the floor cross member 18, through the reinforcing member 199, that is, the front end closed cross-sectional structure part 222 by the front closed cross-sectional structure part 221 and the rear closed cross-sectional structure part 220. Accordingly, since it is possible to reduce a load transmitted to the side sill 12 from the front side frame 67, that is, the vehicle body skeleton part 69 through the vehicle body skeleton part 64 that is formed by the outrigger 17, it is possible to reduce the strength of the outrigger 17. As a result, a reduction in weight is achieved.

Moreover, the reinforcing member 199 is connected to the vehicle body skeleton part 69 that is provided with the connecting portion 72 of the sub-frame 71 supporting the lower arm 76 of the suspension device 75 for the front wheel 74. For this reason, it is possible to disperse a load, which is input to the front portion of the floor body 11 from the sub-frame 71 at the time of a frontal collision, to the vehicle body skeleton part 54, which is formed by the tunnel frame 13, and the vehicle body skeleton part 83, which is formed by the floor cross member 18, by the front closed cross-sectional structure part 221 and the rear closed cross-sectional structure part 220 through the front end closed cross-sectional structure part 222 from the reinforcing member 199. Accordingly, since it is possible to reduce a load transmitted to the side sill 12 from the vehicle body skeleton part 69, which is provided with the connecting portion 72 of the sub-frame 71, through the outrigger 17, that is, the vehicle body skeleton part 64, it is possible to reduce the strength of the outrigger 17. As a result, a reduction in weight is achieved. In addition, since the rear end portion of the front side frame 67, that is, the vehicle body skeleton part 69 and the connecting portion 72 of the sub-frame 71 correspond to each other in the vehicle width direction, it is possible to disperse a load of a frontal collision well.

Figure 26:
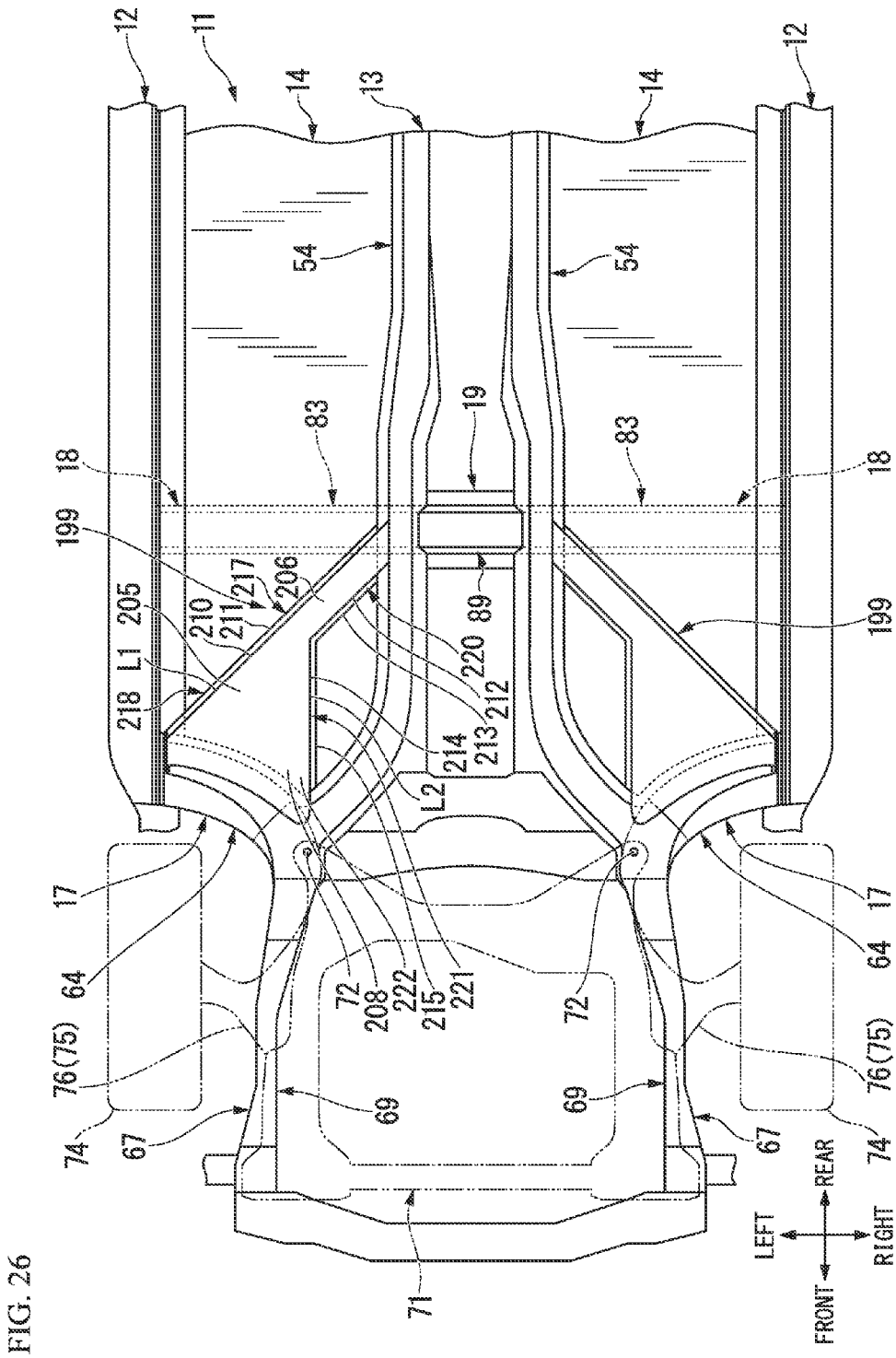
FIG. 26 is a view of a modification of the vehicle body floor structure according to the second embodiment of the invention when seen from below.

Further, since the front component part 218, of which the width is increased toward the front side, of the reinforcing member 199 extends toward only the center side of the vehicle width direction on the extended line of the rear component part 217, it is possible to linearly form the ridge L1 formed between the base plate portion 205 and the wall plate portion 210 that are formed at the outer portion of the reinforcing member 199 in the vehicle width direction. Accordingly, it is possible to suppress the increase of the weight of the reinforcing portion 199. Furthermore, the reinforcing member 199 is easily changed so as to cope with, for example, a case where the front side frame 67, that is, the vehicle body skeleton part 69 or the connecting portion 72, which is a mount point of the sub-frame 71, varies according to the type of a vehicle. That is, it may be possible to cope with a case where the vehicle body skeleton part 69 or the connecting portion 72 varies according to the type of a vehicle, by employing the above-mentioned structure or a structure where, for example, the wall plate portion 214 of the reinforcing portion 199 is formed along the fore and back direction so that the widened shape of the front component part 218 is reduced as shown in FIG. 26. Meanwhile, when the widened shape of the front component part 218 is reduced as shown in FIG. 26, the inner surface of the wall plate portion 214 of the front component part 218 of the reinforcing member 199 facing the center side of the vehicle width direction is disposed on the rear extension of the rear end portion of the front side frame 67 extending forward from the floor body 11. Accordingly, it is possible to suppress the increase of the weight of the reinforcing portion 199, and to smoothly transmit a load, which is input to the front portion of the floor body 11 from the vehicle body skeleton part 69 formed by the front side frame 67 at the time of a frontal collision, to the vehicle body skeleton part 54 formed by the tunnel frame 13.

Figure 27:
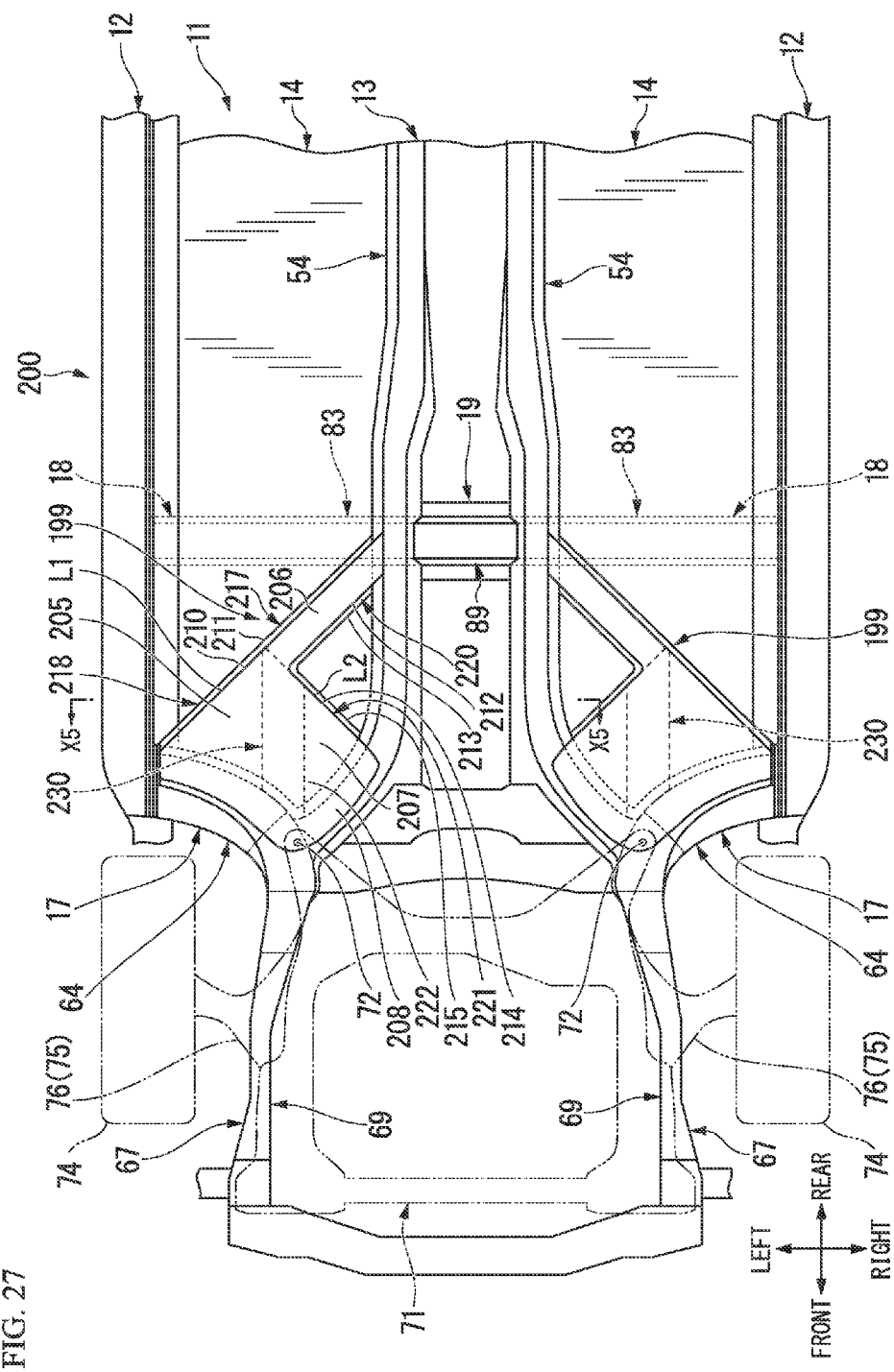
FIG. 27 is a view of another modification of the vehicle body floor structure according to the second embodiment of the invention when seen from below.
Figure 28:
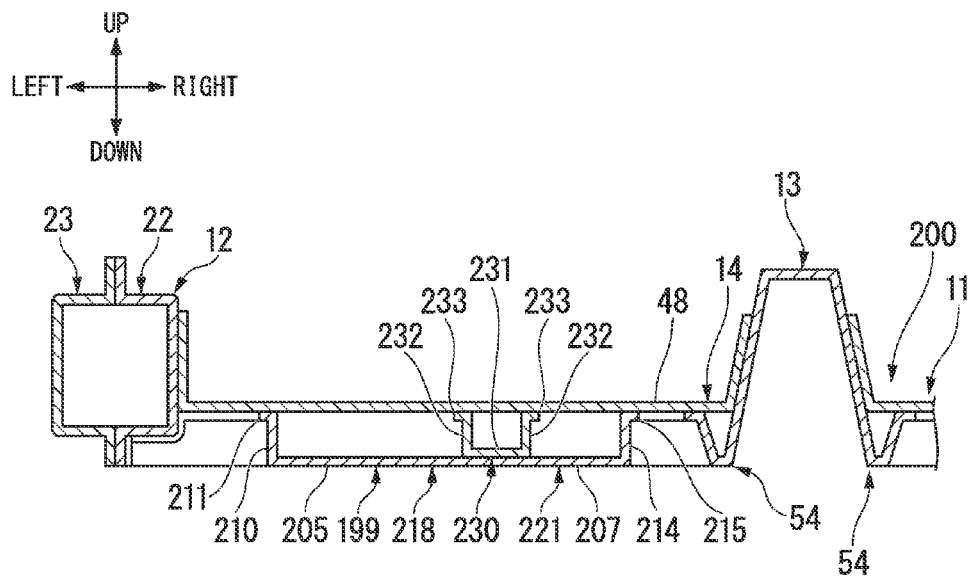
FIG. 28 is a cross-sectional view taken along line X5-X5 of FIG. 27.

Moreover, a connecting member 230 which connects the wide plate portion 207 and the front plate portion 208 to the floor body 11, may be provided between the wide plate portion 207 of the front component part 218 of the reinforcing member 199 and the front plate portion 208 and the floor body 11 as shown in FIGS. 27 and 28. The connecting member 230 is linearly formed so as to be elongated in one direction as shown in FIG. 27. The connecting member 230 has a hat-like cross-sectional shape, and includes a main plate portion 231 that is disposed substantially horizontally as shown in FIG. 28, a pair of wall plate portions 232 that stand from both edge portions of the main plate portion 231 in a width direction so as to be substantially perpendicular to the main plate portion 231, and a pair of flange portions 233 that extend in directions opposite to each other from edge portions of the pair of wall plate portions 232 opposite to the main plate portion 231 so as to be substantially parallel to the main plate portion 231. One end of the connecting member 230 is connected to the outrigger 17, that is, the vehicle body skeleton part 64, the front side frame 67, that is, the rear end portion of the vehicle body skeleton part 69, and the front end portion of the tunnel frame 13, that is, the vehicle body skeleton part 54; and the other end of the connecting member 230 is connected to the wall plate portions 210 and 214 of the reinforcing member 199 as shown in FIG. 27. Further, as shown in FIG. 28, the main plate portion 231 is joined and fixed to the base plate portion 205 of the reinforcing member 199. According to this structure, it is possible to further reinforce the floor body 11, and particularly, to support the load of the frontal collision, which is input through the front side frame 67 or the sub-frame 71, well.

Although the reinforcing member 199 has been provided on the lower surface of the floor body 11 in the above-mentioned embodiment, the reinforcing member 199 may be provided on the upper surface of the floor body 11.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle body floor structure that reinforces a floor body by a reinforcing portion, the floor body including a side sill that is provided on an outer end in a vehicle width direction and extends in a fore and back direction, an outrigger that extends inward from a front end portion of the side sill in the vehicle width direction, a floor cross member that is provided in the rear of the outrigger and extends in the vehicle width direction, and a tunnel frame that is provided in a center side of the vehicle width direction and extends in the fore and back direction,
   wherein the reinforcing portion includes:
      a first member that connects a corner portion between the side sill and a vehicle body skeleton part formed by the outrigger to a corner portion between a vehicle body skeleton part formed by the floor cross member and a vehicle body skeleton part formed by the tunnel frame, and
      a second member that connects a front-end vehicle body skeleton part of a front end of the floor body to a middle portion of the first member,
   wherein the front-end vehicle body skeleton part is a front end portion of a vehicle body skeleton part formed by the tunnel frame, and the second member is connected to the front end portion,
   wherein the reinforcing portion has a T-like shape that is formed by the first and second members, and
   wherein the second member is orthogonally connected to a center portion of the first member.

2. The vehicle body floor structure according to claim 1,
   wherein the front-end vehicle body skeleton part is provided with a connecting portion of a sub-frame that supports a suspension component for a front wheel, and
   the reinforcing portion includes a third member that connects the connecting portion of the sub-frame to the middle portion of the first member.

3. The vehicle body floor structure according to claim 1,
   wherein the reinforcing portion includes a third member that connects a corner portion between the first and second members to a rear portion of a vehicle body skeleton part formed by a front side frame which extends forward from the floor body.

4. A vehicle body floor structure that reinforces a floor body by a reinforcing portion, the floor body including a side sill that is provided on an outer end in a vehicle width direction and extends in a fore and back direction, an outrigger that extends inward from a front end portion of the side sill in the vehicle width direction, a floor cross member that is provided in the rear of the outrigger and extends in the vehicle width direction, and a tunnel frame that is provided in a center side of the vehicle width direction and extends in the fore and back direction,
   wherein the reinforcing portion includes:
      a first member that connects a corner portion between the side sill and a vehicle body skeleton part formed by the outrigger to a corner portion between a vehicle body skeleton part formed by the floor cross member and a vehicle body skeleton part formed by the tunnel frame, and
      a second member that connects a front-end vehicle body skeleton part of a front end of the floor body to a middle portion of the first member,
   wherein the reinforcing portion further includes a front portion which is between the first and second members and of which the width is increased in the vehicle width direction toward the front side, and
   the reinforcing portion is integrally configured with the first member, the second member and the front portion and forms a double-floor structure together with the floor body.

5. The vehicle body floor structure according to claim 4,
   wherein the reinforcing portion is connected to a rear end portion of a vehicle body skeleton part that is formed by a front side frame extending forward from the floor body.

6. The vehicle body floor structure according to claim 4,
   wherein the reinforcing portion is connected to a connecting portion of a sub-frame that supports a suspension component for a front wheel.

7. The vehicle body floor structure according to claim 4,
   wherein the front portion, of which the width is increased toward the front side, of the reinforcing portion extends toward only the center side of the vehicle width direction on an extended line of a rear portion of the reinforcing portion extending in a direction where an outer portion of a vehicle body skeleton part, which is formed by the outrigger, in the vehicle width direction, or a front portion of the side sill and a vehicle body skeleton part formed by the tunnel frame are connected to each other.

8. The vehicle body floor structure according to claim 4,
   wherein an inner surface of the front portion, of which the width is increased toward the front side, of the reinforcing portion facing the center side of the vehicle width direction is disposed on the rear extension of a rear end portion of a vehicle body skeleton part that is formed by a front side frame extending forward from the floor body.

9. The vehicle body floor structure according to claim 4,
   wherein a connecting member, which connects the front portion of the reinforcing portion to the floor body, is provided between the front portion, of which the width is increased toward the front side, of the reinforcing portion and the floor body.

10. A vehicle body floor structure that reinforces a floor body by a reinforcing portion, the floor body including a side sill that is provided on an outer end in a vehicle width direction and extends in a fore and back direction, an outrigger that extends inward from a front end portion of the side sill in the vehicle width direction, a floor cross member that is provided in the rear of the outrigger and extends in the vehicle width direction, and a tunnel frame that is provided in a center side of the vehicle width direction and extends in the fore and back direction,
    wherein the reinforcing portion includes:
       a first member that connects a corner portion between the side sill and a vehicle body skeleton part formed by the outrigger to a corner portion between a vehicle body skeleton part formed by the floor cross member and a vehicle body skeleton part formed by the tunnel frame, a second member that connects a front-end vehicle body skeleton part of a front end of the floor body to a middle portion of the first member, and a third member that connects a corner portion between the first and second members to a vehicle body skeleton part formed by the tunnel frame.

\* \* \* \* \*